(12) United States Patent
Yamasaki

(10) Patent No.: US 7,755,843 B2
(45) Date of Patent: Jul. 13, 2010

(54) ZOOM LENS AND IMAGE PROJECTION APPARATUS HAVING THE SAME

(75) Inventor: Shinji Yamasaki, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 61 days.

(21) Appl. No.: 12/135,029

(22) Filed: Jun. 6, 2008

(65) Prior Publication Data

US 2008/0304162 A1    Dec. 11, 2008

(30) Foreign Application Priority Data

Jun. 8, 2007    (JP)    ............... 2007-152704

(51) Int. Cl.
 *G02B 15/14* (2006.01)
(52) U.S. Cl. ............... 359/680; 359/683; 359/684; 359/685; 359/740; 359/770; 359/714
(58) Field of Classification Search ......... 359/680–685, 359/740, 770, 714
See application file for complete search history.

(56) References Cited

U.S. PATENT DOCUMENTS

| | | | |
|---|---|---|---|
| 2002/0015235 A1* | 2/2002 | Hirose | .................. 359/684 |
| 2005/0057819 A1 | 3/2005 | Eguchi | |
| 2006/0066953 A1 | 3/2006 | Nishio et al. | |
| 2006/0132929 A1 | 6/2006 | Ito | |
| 2006/0139768 A1 | 6/2006 | Saori | |
| 2007/0002458 A1 | 1/2007 | Saori | |
| 2007/0030576 A1 | 2/2007 | Arai et al. | |

FOREIGN PATENT DOCUMENTS

| | | |
|---|---|---|
| EP | 1881356 | 1/2008 |
| JP | 2003-015037 | 1/2003 |
| JP | 2003-015038 | 1/2003 |
| JP | 2004-252084 | 9/2004 |
| JP | 2005-077548 | 3/2005 |

* cited by examiner

*Primary Examiner*—Evelyn A. Lester
(74) *Attorney, Agent, or Firm*—Canon USA Inc IP Div

(57) ABSTRACT

A zoom lens includes a first lens unit having a negative optical power located closest to an enlargement side. In the zoom lens, a focal length of the zoom lens at a wide-angle end (fw) and a focal length of the first lens unit (f1) satisfy the following condition:

$-2.50 < f1/fw < -1.36$.

14 Claims, 10 Drawing Sheets

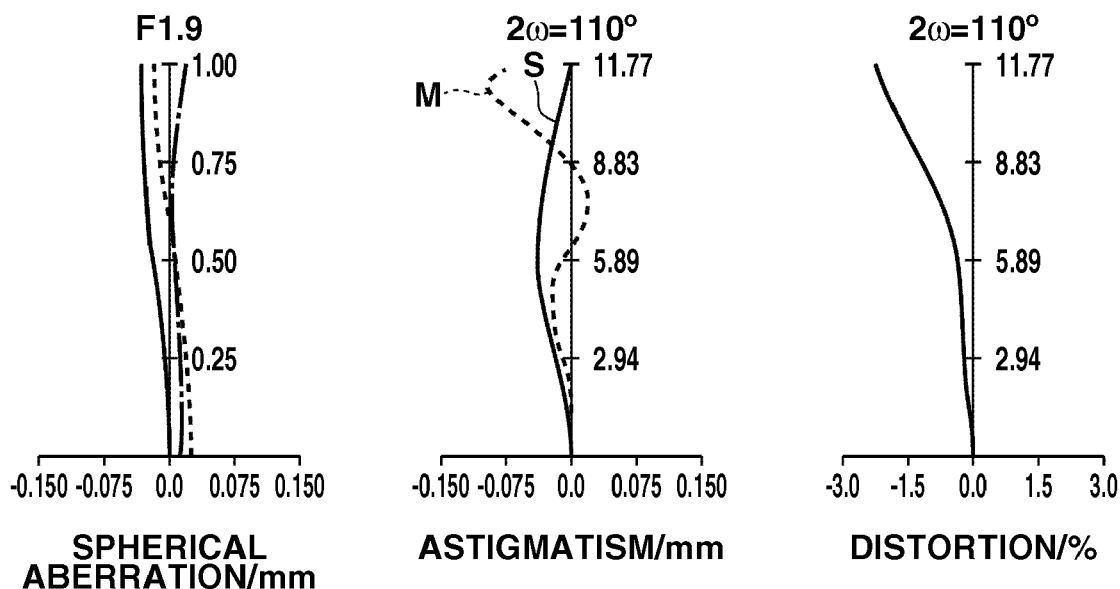
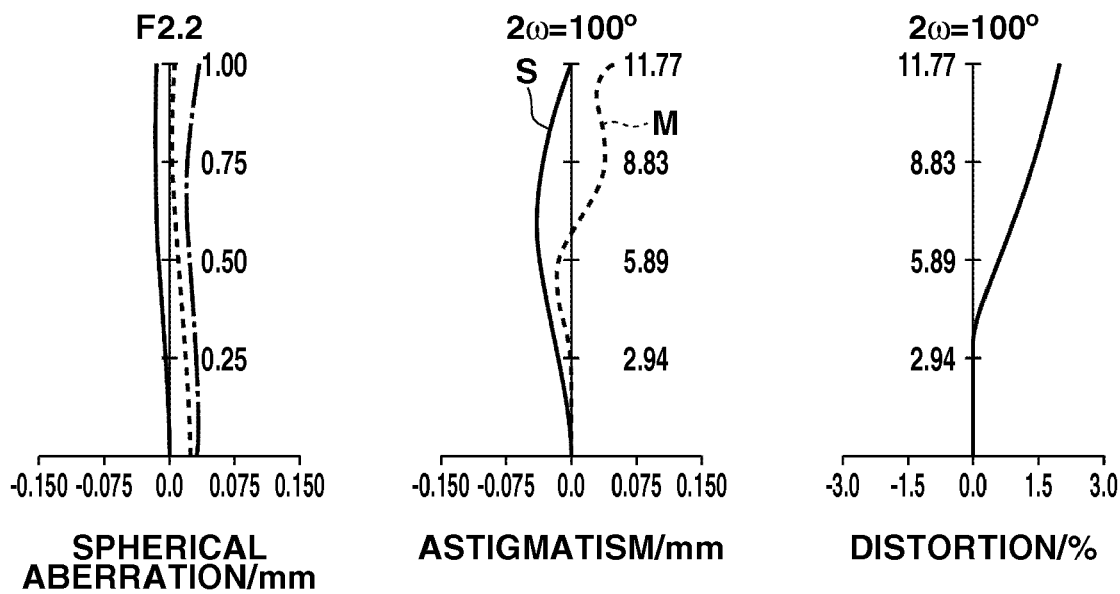

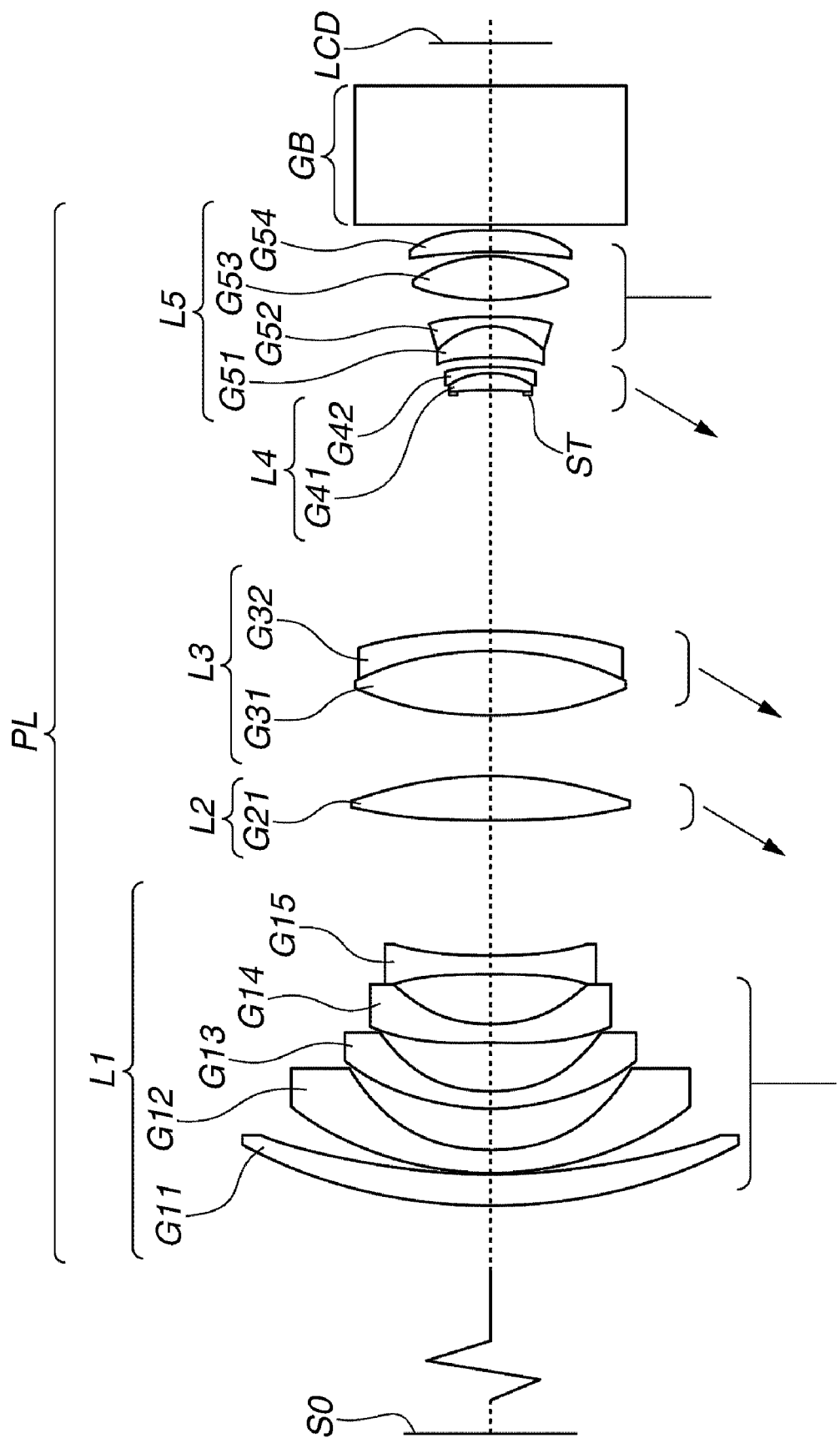

ZOOM LENS AND IMAGE PROJECTION APPARATUS HAVING THE SAME

BACKGROUND OF THE INVENTION

1. Field of the Invention

The present invention relates to a zoom lens. More specifically, the present invention relates to a zoom lens used for an image projection apparatus, such as a liquid crystal projector.

2. Description of the Related Art

It is desired that a conventional zoom lens used for an image projection apparatus, such as a liquid crystal projector, have a long back focal distance and a wide angle of view so that a large size image can be projected at a short distance. Various zoom lenses (variable-power projection lenses for an image projection apparatus) have been proposed, which can project a large size image at a short distance.

Japanese Patent Application Laid-Open No. 2003-015037, Japanese Patent Application Laid-Open No. 2003-015038, and Japanese Patent Application Laid-Open No. 2005-077548 each discuss a zoom lens including first through sixth lens units having negative, positive, positive, negative, positive, and positive refractive powers, respectively, in order from an enlargement side (i.e., from the front side (projection plane side)) to a reduction side (i.e., the rear side (liquid crystal display element side). Furthermore, Japanese Patent Application Laid-Open No. 2004-252084 discusses a zoom lens including first through fifth lens units having negative, positive, positive, negative, and positive refractive powers, respectively, in order from the enlargement side.

In the zoom lens discussed in each of Japanese Patent Application Laid-Open Nos. 2003-015037, 2003-015038, 2005-077548, and 2004-252084, a lens unit closest to the enlargement side and a lens unit closest to the reduction side are stationary during zooming. Additionally, the zoom lens is telecentric on the reduction side. However, the above-described conventional zoom lens cannot respond to a growing desire for achieving a wider angle of view.

SUMMARY OF THE INVENTION

At least one exemplary embodiment is directed to a zoom lens having an optical system that is telecentric on the reduction side (i.e., having a long back focal distance), configured to easily project a high quality image and having a wide angle of view.

According to an aspect of at least one exemplary embodiment of the present invention, a zoom lens includes a first lens unit having a negative optical power located closest to an enlargement side. In the zoom lens, the focal length of the zoom lens at the wide-angle end (fw) and the focal length of the first lens unit (f1) satisfy the following condition:

$$-2.50 < f1/fw < -1.36.$$

According to another aspect of the present invention, an image projection apparatus includes an image display element, and the above-described zoom lens. The zoom lens is configured to project image light from the image display element.

Further features of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate some exemplary embodiments and features of the invention and, together with the description, serve to explain some of the principles of the invention.

FIGS. 2A and 2B are charts illustrating various aberrations occurring in the zoom lens according to the first exemplary embodiment of the present invention.

FIG. 7 is a diagram illustrating components of an image projection apparatus including a zoom lens according to a fourth exemplary embodiment of the present invention.

DETAILED DESCRIPTION OF THE EMBODIMENTS

Figure 1:
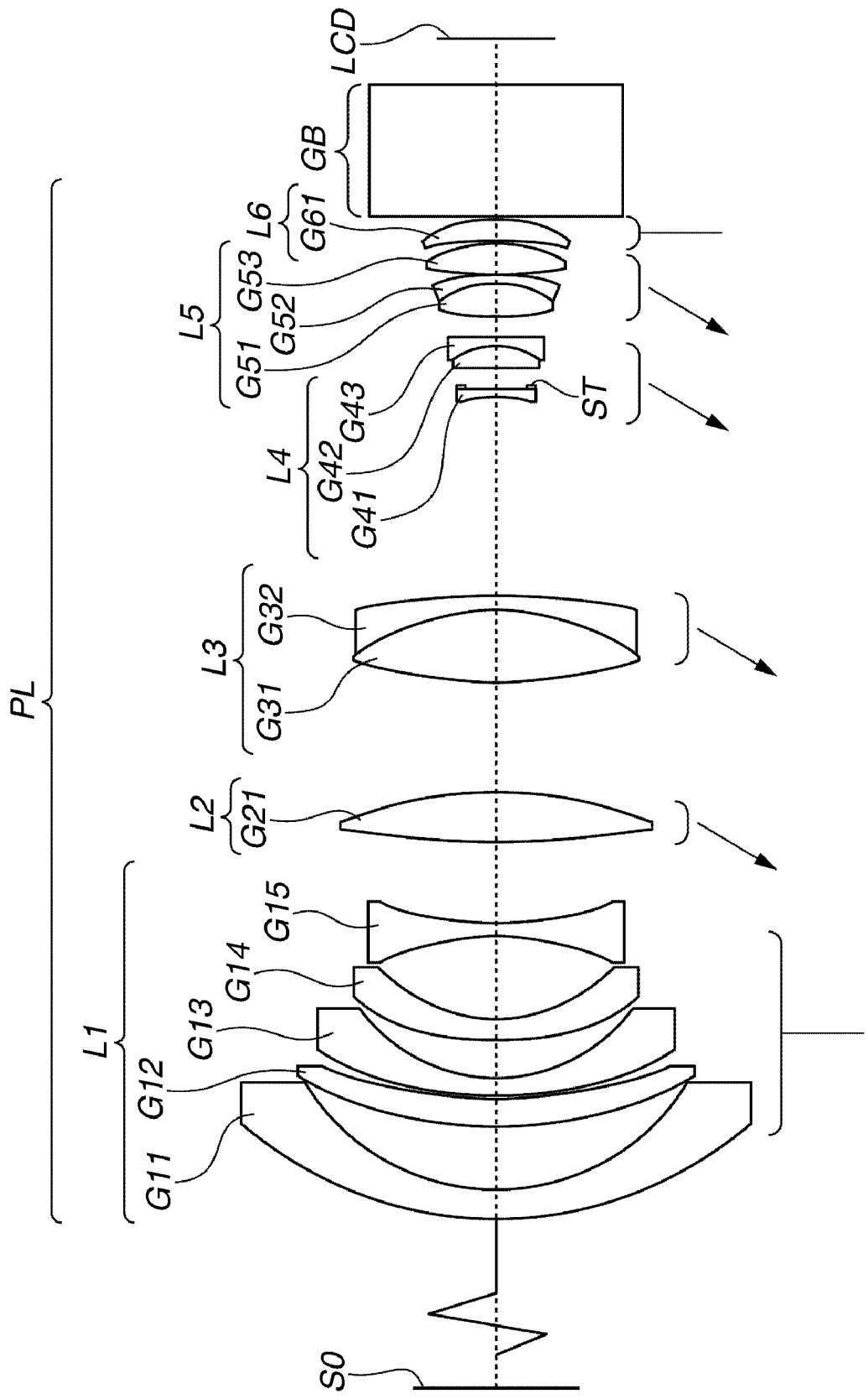
FIG. 1 is a diagram illustrating components of an image projection apparatus including a zoom lens according to a first exemplary embodiment of the present invention.

Various exemplary embodiments of the present invention will now be described in detail with reference to the drawings. It should be noted that the relative arrangement of the components, the numerical expressions, and numerical values set forth in these embodiments do not limit the scope of the present invention unless it is specifically stated otherwise.

The following description of at least one exemplary embodiment is merely illustrative in nature and is in no way intended to limit the invention, its application, or uses.

Processes, techniques, apparatus, and materials as known by one of ordinary skill in the relevant art may not be discussed in detail but are intended to be part of the enabling description where appropriate, for example the fabrication of the lens elements and their materials.

In all of the examples illustrated and discussed herein any specific values, for example the zoom ratio and F number, should be interpreted to be illustrative only and non limiting. Thus, other examples of the exemplary embodiments could have different values.

Notice that similar reference numerals and letters refer to similar items in the following figures, and thus once an item is defined in one figure, it need not be discussed for following figures.

Note that herein when referring to correcting or corrections of an error (e.g., aberration), a reduction of the error and/or a correction of the error is intended.

Now, a zoom lens and an image projection apparatus including the zoom lens will be described. A zoom lens according to an exemplary embodiment of the present invention includes a first lens unit having a negative optical power (refractive power) and located closest to the enlargement side. A focal length of the zoom lens at a wide-angle end (fw) and a focal length of the first lens unit (f1) satisfy the following condition:

$$-2.50 < f1/fw < -1.36 \quad (1)$$

If the value of term "f1/fw" in the conditional expression (1) exceeds the lower limit, the refractive power of the first lens unit becomes too small. Accordingly, a large diameter of the first lens unit is required. Thus, the total size of the zoom lens may become larger and the total weight of the zoom lens may become greater. On the other hand, if the value of term "f1/fw" in the conditional expression (1) exceeds the upper limit, the refractive power of the first lens unit becomes too large. In this case, an error sensitivity of the zoom lens during manufacture may become too high or the amount of aberrations occurring in the zoom lens may become too large to be appropriately corrected. With the above-described configuration, the present invention can achieve a zoom lens having an optical system that is telecentric on the reduction side (i.e., having a long back focal distance), configured to easily project a high quality image and having a wide angle of view.

It is further useful if the zoom lens according to the present exemplary embodiment satisfies the following conditional expression:

$$-2.10 < f1/fw < -1.36 \quad (1a)$$

The zoom lens according to the present exemplary embodiment can additionally satisfy the following conditions. More specifically, the zoom lens according to the present exemplary embodiment is more useful if the zoom lens satisfies the following conditional expressions (2) through (11) and has the following other exemplary configurations.

The other configurations and the conditions will be described below.

The first lens unit of the zoom lens according to the present exemplary embodiment includes one or more negative lenses having an aspheric surface. An effective diameter of an aspheric surface that is the largest of the aspheric surfaces of the one or more negative lenses ($\phi$max) (the aspheric surface whose effective diameter is the largest of those aspheric surfaces of the one or more negative lenses is hereinafter referred to as a "first aspheric surface"), a focal length of the first lens unit (f1asp), and a distance in an optical axis direction between a position of the first aspheric surface on the optical axis and a position of the first aspheric surface through which an outermost off-axis ray passes (Rdepth—see FIG. 10) can satisfy the following condition:

$$-9.0 < \phi max/f1 < -3.0 \quad (2)$$

$$-10.0 < Rdepth/f1asp < -4.0 \quad (3)$$

The conditional expression (2) provides a condition for an appropriate relationship between the effective diameter of the aspheric surface that is the largest of the aspheric surfaces of the one or more negative lenses ($\phi$max) and the focal length of the first lens unit having the negative lens (aspheric lens) (f1asp).

Locating the aspheric surface (of the negative lens) at the appropriate position defined by the conditional expression (2) enables an aberration such as distortion to be efficiently reduced or corrected. Such distortion may increase in a zoom lens having a wide angle of view. That is, aberrations can be efficiently reduced by locating the aspheric surface of the negative lens at a position at which the ray is appropriately dispersed (from a position on the optical axis to the maximum angle of view), namely, at a position having an appropriate distance from a stop at which a ray density is appropriately low.

If the lower limit of the conventional expression (2) is exceeded, the lens diameter of the negative lens having an aspheric shape becomes too large. Furthermore, it is not useful to use an aspheric lens having a large diameter because in this case, in terms of availability in manufacture, a surface accuracy of the aspheric surface may be low. On the other hand, if the upper limit of the conventional expression (2) is exceeded, the lens diameter of the negative lens having an aspheric shape becomes too small. In this case, aberration cannot be effectively corrected.

It is further useful, in reducing the amount of distortion (correcting distortion), if the effective diameter of the aspheric surface that is the largest of the aspheric surfaces of the one or more negative lenses ($\phi$max) and the focal length of the first lens unit (f1) satisfy the following conditional expression:

$$-5.0 < \phi max/f1 < -3.3 \quad (2a)$$

Furthermore, the first lens unit includes one or more negative lenses having an aspheric surface satisfying the above-described conditional expression (3) (the first aspheric surface). In the conditional expression (3), the focal length of the first aspheric surface, of the aspheric surfaces of the one or more negative lenses, is taken as "f1asp" and the distance in the optical axis direction between the position of the first aspheric surface on the optical axis and a position of the first aspheric surface through which an outermost off-axis ray passes (i.e., a depth of the aspheric surface within the effective diameter) is taken as "Rdepth".

Figure 10:
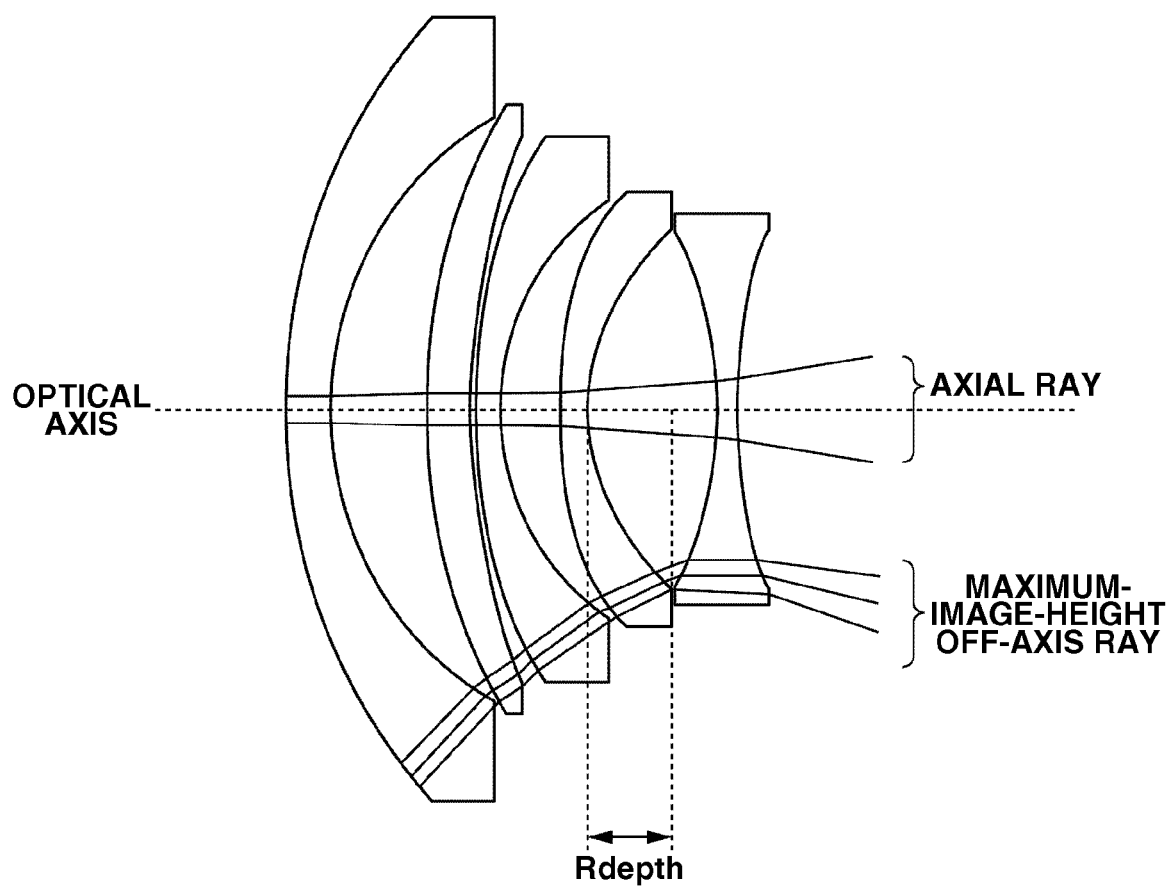
FIG. 10 is a diagram illustrating a conditional expression (3) according to an exemplary embodiment of the present invention.

With respect to the distance Rdepth, as illustrated in FIG. 10, a lens surface facing the right side in FIG. 10 (reduction side) of a lens located second from the right in FIG. 10 (i.e., from the reduction side) is an aspheric surface. Rdepth indicates a distance in the optical axis direction between an intersection point of the aspheric surface (the first aspheric surface) and the optical axis and an intersection point of the outermost off-axis ray and the aspheric surface. Here, an "outermost off-axis ray" (maximum-image-height off-axis ray) refers to a ray passing through an outermost position (a position at which the image height is highest) of the aspheric surface (the first aspheric surface), of the light flux that is incident at (or exits from) a position of an image plane (or an object plane) at which the image height is highest. The lens diameter defined by the position at which the outermost off-axis ray passes through can be used as the effective diameter.

By providing the aspheric surface satisfying the conditional expression (3), the amount of distortion can be reduced even if the optical power (refractive power) of the first lens unit (within the effective diameter) is large. If the upper limit or the lower limit of the conditional expression (3) is exceeded, the amount of barrel distortion or pin-cushion distortion may become too large.

It is further useful if the aspheric surface (the first aspheric surface) satisfies the following condition:

$$-8.0 < Rdepth/f1asp < -5.0 \quad (3a)$$

The zoom lens according to the present exemplary embodiment includes a plurality of lens units. It is useful that at least one lens unit of the zoom lens is moveable in the optical axis direction to perform zooming. In this regard, it is further useful that the zoom lens includes five or more lens units and three or more lens units of the zoom lens move in the optical axis direction to perform zooming.

In this case, it is further useful that a lens unit located closest to the enlargement side (the screen side (the front side)) and a lens unit located closest to the reduction side (the liquid crystal display element side (the rear side)) are stationary in the optical axis direction for zooming. In performing a focusing operation at the same time as zooming, either one of the lens unit located closest to the enlargement side and the lens unit located closest to the reduction side can be moved. However, this is intended merely to perform a focusing operation and is not intended for zooming.

Furthermore, the lens unit located closest to the reduction side of the zoom lens according to the present exemplary embodiment includes one or more positive lenses having an aspheric surface. One positive lens of the one or more positive lenses (or all of the positive lenses) is made of a glass material. Here, a focal length of the positive lens (fGasp) and a focal length of the zoom lens at the wide-angle end (fw) satisfy the following conditional expression:

$$5.2 < fGasp/fw < 9.0 \quad (4)$$

The zoom lens according to the present exemplary embodiment includes a positive lens made of a glass material, to which a refractive power can be relatively easily provided, so that an appropriate telecentricity can be achieved on the rearmost side (the reduction conjugation side). Furthermore, by using a positive lens having an aspheric surface, residual off-axis aberration can be effectively reduced or corrected.

If the lower limit of the conditional expression (4) is exceeded, the refractive power of the positive lens having an aspheric surface may become too large. In this case, the positional sensitivity of the positive lens and the sensitivity to a manufacturing error may become too high. On the other hand, if the upper limit of the conditional expression (4) is exceeded, it becomes difficult to provide an appropriately high level of telecentricity to the zoom lens.

It is further useful if the zoom lens according to the present exemplary embodiment preferably satisfies the following conditional expression:

$$6.0 < fGasp/fw < 8.5 \quad (4a)$$

Moreover, it is also useful to use a hybrid aspheric lens having an aspheric surface (aspheric component) made of a resin material and provided on a spherical lens made of a glass material, or to use a plastic-molded aspheric lens.

A first lens unit of the zoom lens according to first and fourth exemplary embodiments of the present invention includes one or more positive lenses that satisfy the following conditional expressions:

$$1.63 < nd \quad (5)$$

$$vd < 35 \quad (6)$$

$$0.008 < \theta gF - (0.644 - 0.00168 \cdot vd) < 0.040 \quad (7)$$

where "vd" denotes an Abbe number and "θgF" denotes a relative partial dispersion. The Abbe number vd and the relative partial dispersion θgF are expressed as follows:

$$vd = (nd-1)/(nF-nC)$$

$$\theta gF = (ng-nF)/(nF-nC)$$

where "nd", "ng", "nF", and "nC" denote refractive indices of a material of the positive lens with respect to d-line light (having a wavelength of 587.56 nm), g-line light (having a wavelength of 435.84 nm), F-line light (having a wavelength of 486.13 nm), and C-line light (having a wavelength of 656.28 nm), respectively.

Here, the conditional expression (5) is provided supposing that a positive lens having a high refractive index is used in the first lens unit. With this configuration, the lens diameter and the total length of the zoom lens can be reduced, and furthermore, distortion can be effectively corrected. If the lower limit of the conditional expression (5) is exceeded, the lens diameter and the total length of the zoom lens may not be reduced and distortion may not be appropriately corrected.

The conditional expression (6) supposes that the material of the positive lens in the first lens unit has a high dispersion level (i.e., has a small Abbe number). The conditional expression (6) provides a condition for effectively correcting chromatic aberration of magnification (lateral chromatic aberration). If the upper limit of the conditional expression (6) is exceeded, chromatic aberration of magnification may not be effectively corrected.

The conditional expression (7) provides a condition for correcting extraordinary partial dispersion of the material of the positive lens in the first lens unit. More specifically, the conditional expression (7) provides a condition for effectively correcting axial chromatic aberration and chromatic aberration of magnification. If the upper limit of the conditional expression (7) is exceeded, axial chromatic aberration and chromatic aberration of magnification may be overcorrected. On the other hand, if the lower limit of the conditional expression (7) is exceeded, axial chromatic aberration and chromatic aberration of magnification may be undercorrected. In these cases, axial chromatic aberration and chromatic aberration of magnification may occur.

The conditional expressions (5), (6), and (7) are provided separately from one another. That is, it is useful that the zoom lens according to the first and fourth exemplary embodiments satisfies either one of the conditional expressions (5), (6), and (7) and thus it is not always necessary for the zoom lens according to the first and fourth exemplary embodiments to satisfy the conditional expressions (5), (6), and (7) at the same time.

It is further useful if the zoom lens according to the first and fourth exemplary embodiments preferably satisfies the following conditional expressions:

$$1.70 < nd \quad (5a)$$

$$vdn < 28 \quad (6a)$$

$$0.010 < \theta gF - (0.644 - 0.00168 \cdot vd) < 0.038 \quad (7a)$$

The zoom lens according to the first and second exemplary embodiments of the present invention includes first through sixth lens units having negative, positive, positive, negative, positive, and positive refractive powers (optical powers), respectively, in order from the enlargement side to the reduction side. The first and sixth lens units are stationary for zooming. That is, the second through fifth lens units move to perform zooming.

The zoom lens according to the first and second exemplary embodiments includes six lens units, as described above. The zoom lens according to the first and second exemplary embodiments has a lens configuration useful for decreasing the total size of the zoom lens system, providing high telecentricity for the entire zoom range, and effectively correcting aberration, by appropriately arranging the lens units.

Furthermore, the first lens unit and the sixth lens unit of the zoom lens according to the first and second exemplary embodiments are stationary (do not move) for zooming.

However, the first lens unit and the sixth lens unit of the zoom lens according to the first and the second exemplary embodiments can move during a focusing operation. By not extending the length of the lens barrel for zooming, the strength of a projection lens as an integrated structure can be appropriately maintained.

Furthermore, a focal length of the second lens unit (f2b), a focal length of the third lens unit (f3b), and a focal length of the zoom lens at the wide-angle end (fw) preferably satisfy the following conditional expressions:

$$6.5 < f2b/fw < 11 \tag{8}$$

$$6.0 < f3b/fw < 13 \tag{9}$$

The conditional expression (8) provides a condition for an appropriate relationship between the focal length of the second lens unit (f2b) and the focal length of the zoom lens at the wide-angle end (fw). By providing a positive refractive power to the second lens unit to provide appropriate power arrangement to the entire zoom lens, off-axis aberration (distortion or astigmatism) that is not thoroughly corrected by the first lens unit can be further reduced or corrected.

If the lower limit of the conditional expression (8) is exceeded, the refractive power of the second lens unit becomes too large. In this case, the balance among various aberrations may be lost. On the other hand, if the upper limit of the conditional expression (8) is exceeded, the refractive power of the second lens unit becomes too small. In this case, aberration may not be effectively corrected.

The conditional expression (9) provides a condition for an appropriate relationship between the focal length of the third lens unit (f3b) and the focal length of the zoom lens at the wide-angle end (fw). The third lens unit mainly functions to perform zooming in the zoom lens. By providing an appropriate power to the third lens unit, the zoom lens can exert a high performance in the entire zoom range between the wide-angle end and the telephoto end.

If the lower limit of the conditional expression (9) is exceeded, the refractive power of the third lens unit becomes too large. In this case, the balance among various aberrations may be lost and the sensitivity (for example, the positional sensitivity) may become too high. On the other hand, if the upper limit of the conditional expression (9) is exceeded, the refractive power of the third lens unit becomes too small. In this case, the total length of the zoom lens may become too long.

It is further useful if the zoom lens according to the first and second exemplary embodiments satisfies the following conditional expressions:

$$7.5 < f2b/fw < 10 \tag{8a}$$

$$7.5 < f3b/fw < 12 \tag{9a}$$

The zoom lens according to third and fourth exemplary embodiments of the present invention includes first through fifth lens units having negative, positive, positive, negative, and positive refractive powers (optical powers), respectively, in order from the enlargement side to the reduction side. The first and fifth lens units are stationary for zooming. However, the first lens unit and the fifth lens unit of the zoom lens according to the third and fourth exemplary embodiments can move during a focusing operation. By not extending the length of the lens barrel during zooming, the strength of a projection lens as an integrated structure can be appropriately maintained.

Furthermore, a focal length of the second lens unit (f2a), a focal length of the third lens unit (f3a), and a focal length of the zoom lens at the wide-angle end (fw) preferably satisfy the following conditional expressions:

$$6.0 < f2a/fw < 12 \tag{10}$$

$$6.0 < f3a/fw < 15 \tag{11}$$

The conditional expression (10) provides a condition for an appropriate relationship between the focal length of the second lens unit (f2a) and the focal length of the zoom lens at the wide-angle end (fw). By providing a positive refractive power to the second lens unit to provide appropriate power arrangement to the entire zoom lens, off-axis aberration (distortion or astigmatism) that is not thoroughly corrected by the first lens unit can be further reduced or corrected.

If the lower limit of the conditional expression (10) is exceeded, the refractive power of the second lens unit becomes too large. In this case, the balance among various aberrations may be lost. On the other hand, if the upper limit of the conditional expression (10) is exceeded, the refractive power of the second lens unit becomes too small. In this case, aberration may not be effectively corrected.

The conditional expression (11) provides a condition for an appropriate relationship between the focal length of the third lens unit (f3a) and the focal length of the zoom lens at the wide-angle end (fw). The third lens unit mainly functions to perform zooming in the zoom lens. By providing an appropriate power to the third lens unit, the zoom lens can exert a high performance in the entire zoom range between the wide-angle end and the telephoto end.

If the lower limit of the conditional expression (11) is exceeded, the refractive power of the third lens unit becomes too large. In this case, the balance among various aberrations may be lost and the sensitivity may become too high. On the other hand, if the upper limit of the conditional expression (11) is exceeded, the refractive power of the third lens unit becomes too small. In this case, the total length of the zoom lens may become too long.

It is further useful if the zoom lens according to the third and fourth exemplary embodiments preferably satisfies the following conditional expressions:

$$8.5 < f2a/fw < 10 \tag{10a}$$

$$8.0 < f3a/fw < 12.5 \tag{11a}$$

As described above, the first through fourth exemplary embodiments each include five or six lens units appropriately arranged in the zoom lens. With the above-described configuration, the entire Zoom lens can be downsized, telecentricity can be maintained at an appropriate level for the entire zoom range, and aberration can be effectively corrected.

In the first through fourth exemplary embodiments, the first lens unit moves along the optical axis (in the optical axis direction) to perform a focusing (adjustment) operation. However, the present invention is not limited to this. That is, the focusing operation can be performed by moving a display panel (an image display element, a liquid crystal panel, a liquid crystal display element, or a liquid crystal display device) or a lens unit other than the first lens unit L1 (for example, a lens unit located closest to the reduction side). In this case, it is useful that the display panel (image display element) is stationary for zooming.

Furthermore, in each of the exemplary embodiments of the present invention, a surface of each lens can be multi-coated. With this configuration, a decrease of illuminance on a screen surface can be reduced.

FIG. 1 is a diagram illustrating components of an image projection apparatus (liquid crystal video projector) including a zoom lens according to a first exemplary embodiment of the present invention. Table 1, which is described below, includes, with respect to the entire zoom lens according to the first exemplary embodiment, a focal length, an F-number, a radius of curvature of each lens surface (optical surface) and a surface interval thereof, a refractive index and an Abbe number of each lens element, a lens surface interval at the wide-angle end and the telephoto end, and an aspheric coefficient. In Table 1, the value for the radius of curvature and the surface interval is indicated in millimeters (mm). However, the value for the radius of curvature and the surface interval can be indicated in units other than millimeters (mm).

FIG. 2A illustrates aberration charts for the zoom lens at the wide-angle end (short focal length end) in the case where a distance to an object (the distance from the first lens unit to the object) is 0.63 m according to the first exemplary embodiment of the present invention. FIG. 2B illustrates aberration charts for the zoom lens at the telephoto end (long focal length end) in the case where a distance to an object (the distance from the first lens unit to the object) is 0.63 m according to the first exemplary embodiment of the present invention.

Figure 3:
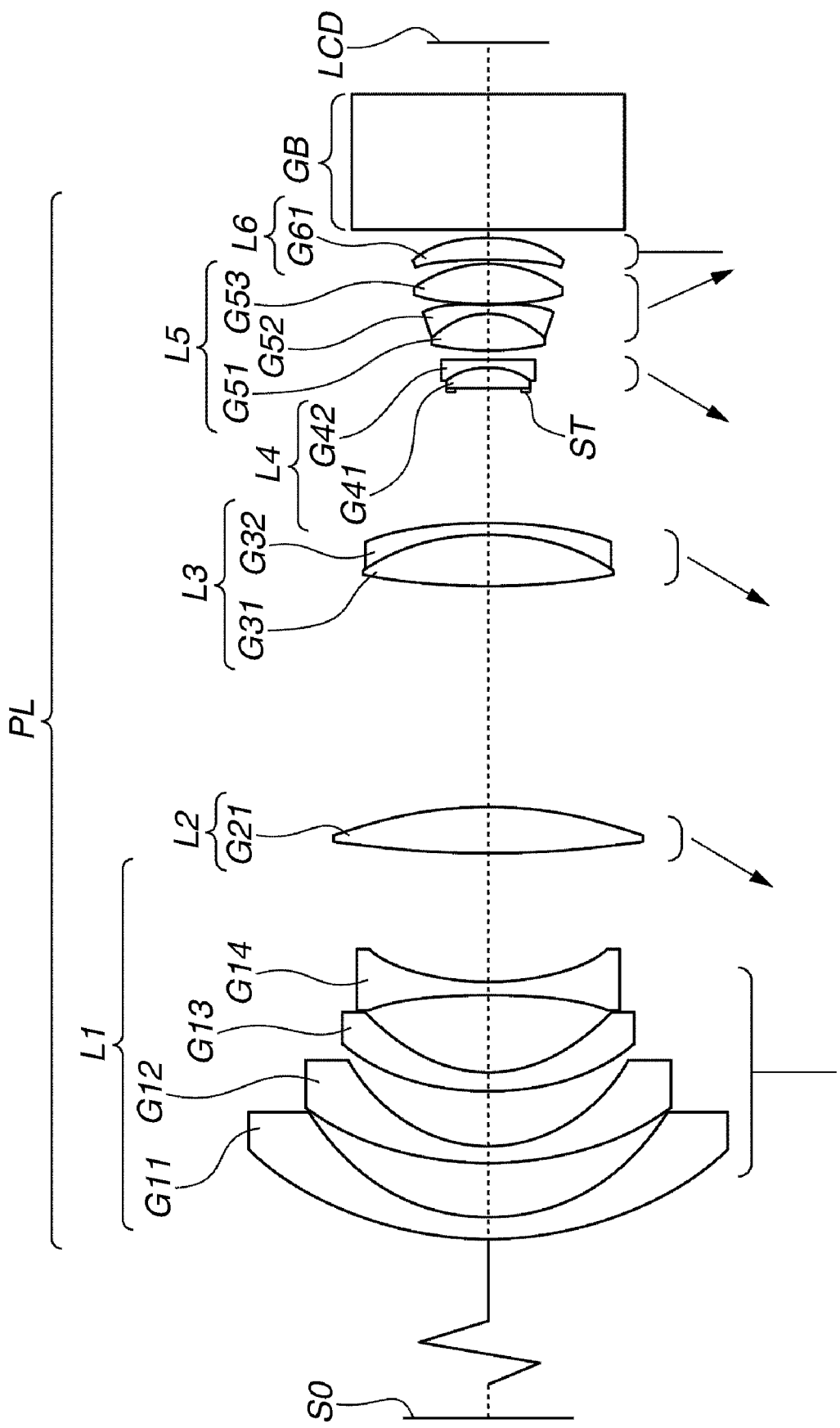
FIG. 3 is a diagram illustrating components of an image projection apparatus including a zoom lens according to a second exemplary embodiment of the present invention.
Figure 5:
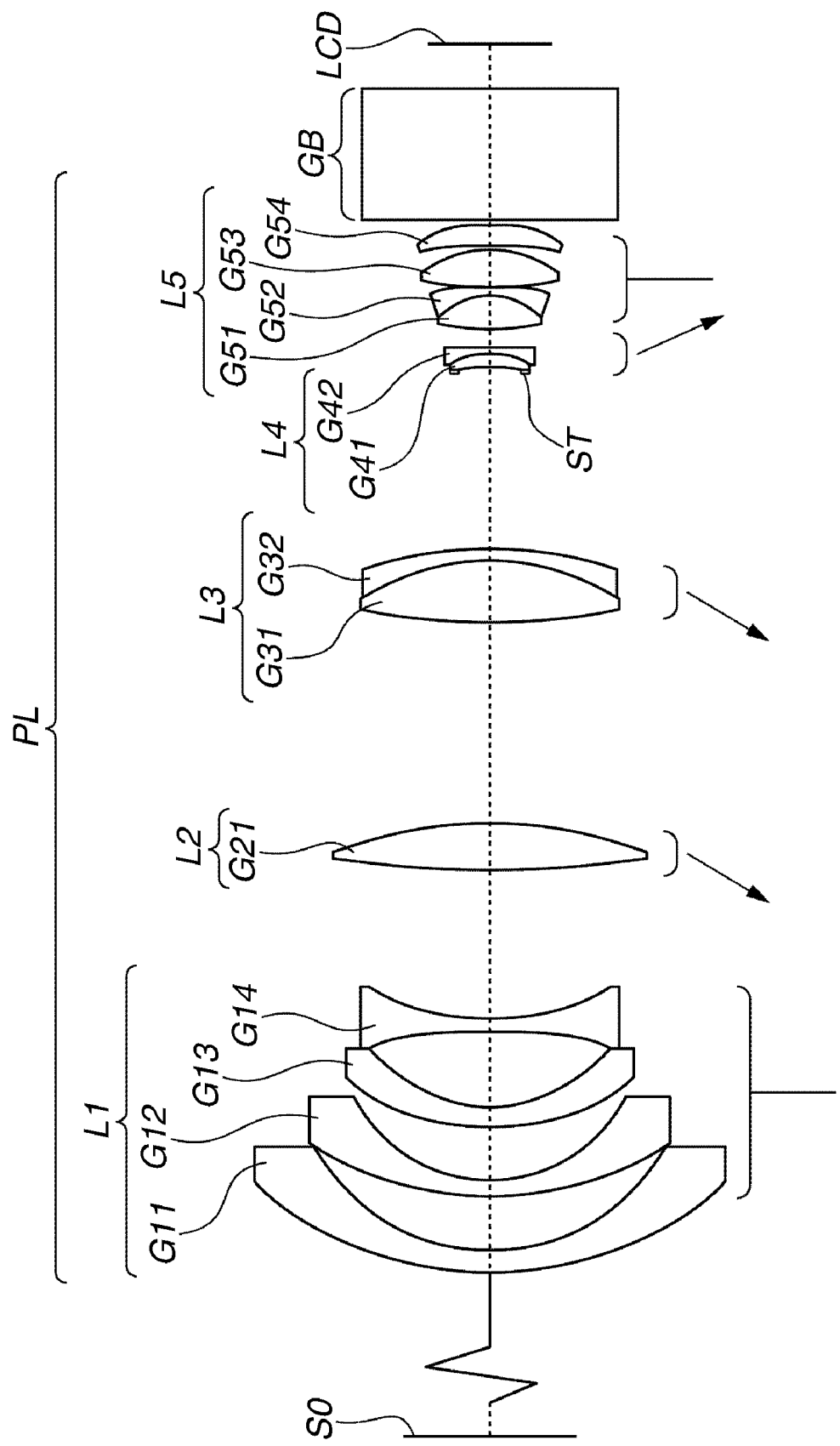
FIG. 5 is a diagram illustrating components of an image projection apparatus including a zoom lens according to a third exemplary embodiment of the present invention.

FIGS. 3, 5, and 7, as FIG. 1, each illustrate an example of components of an image projection apparatus (liquid crystal video projector) including a zoom lens according to the second, third, and fourth exemplary embodiments of the present invention. Tables 2, 3, 4, which are described below, each include, with respect to the entire zoom lens according to the second, third, and fourth exemplary embodiments, a focal length, an F-number, a radius of curvature of each lens surface (optical surface) and a surface interval thereof, a refractive index and an Abbe number of each lens element, a lens surface interval at the wide-angle end and the telephoto end, and an aspheric coefficient.

Figure 4A:
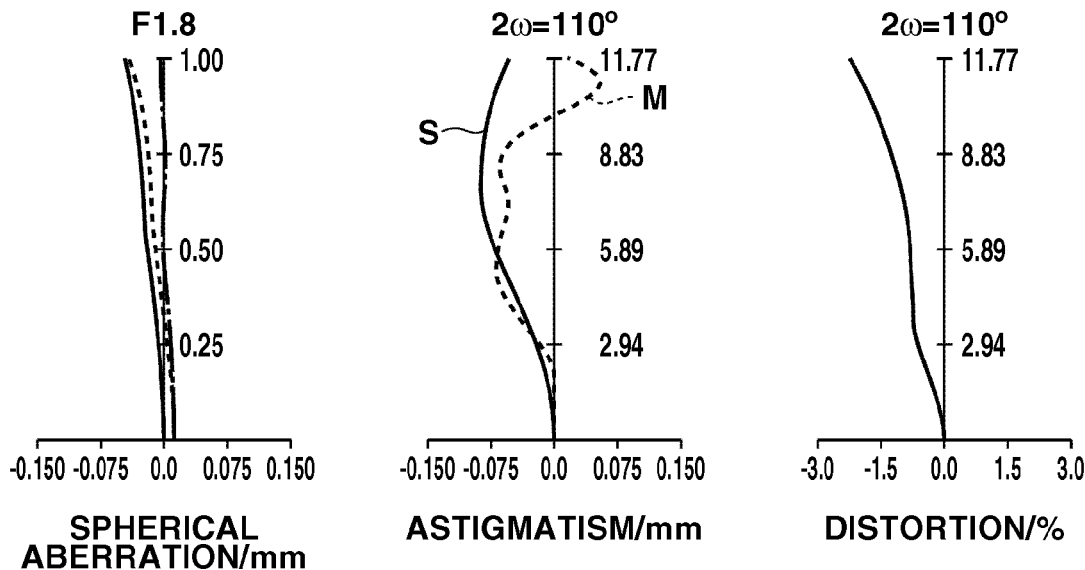
FIGS. 4A and 4B are charts illustrating various aberrations occurring in the zoom lens according to the second exemplary embodiment of the present invention.
Figure 4B:
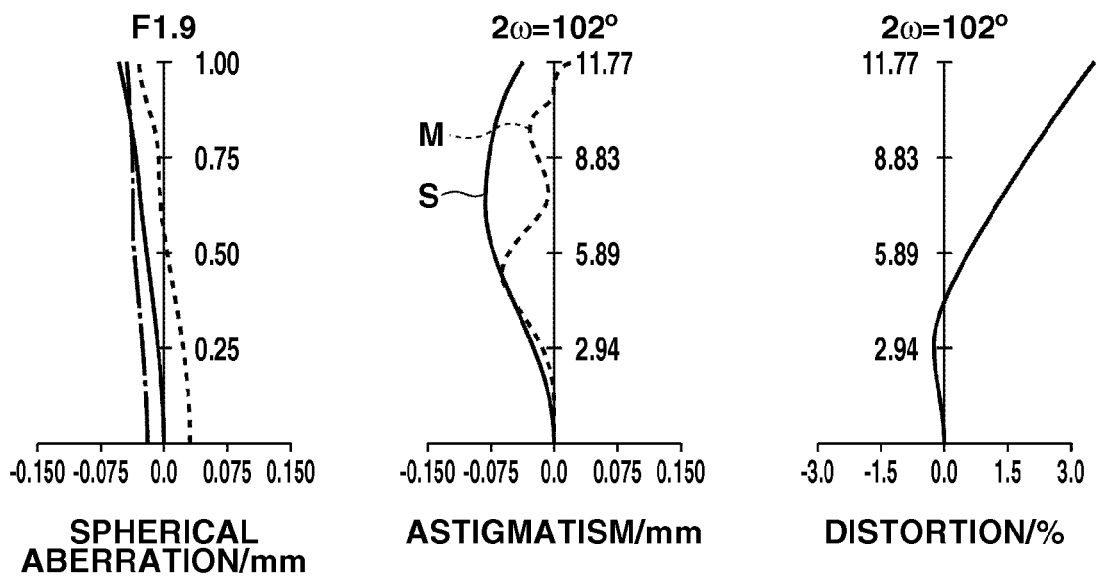
Figure 6A:
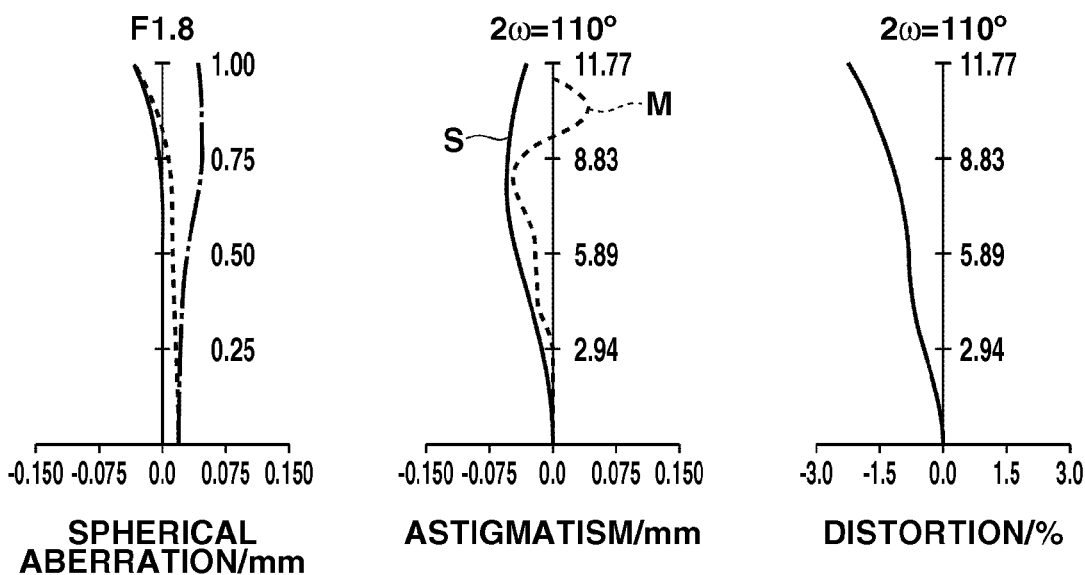
FIGS. 6A and 6B are charts illustrating various aberrations occurring in the zoom lens according to the third exemplary embodiment of the present invention.
Figure 6B:
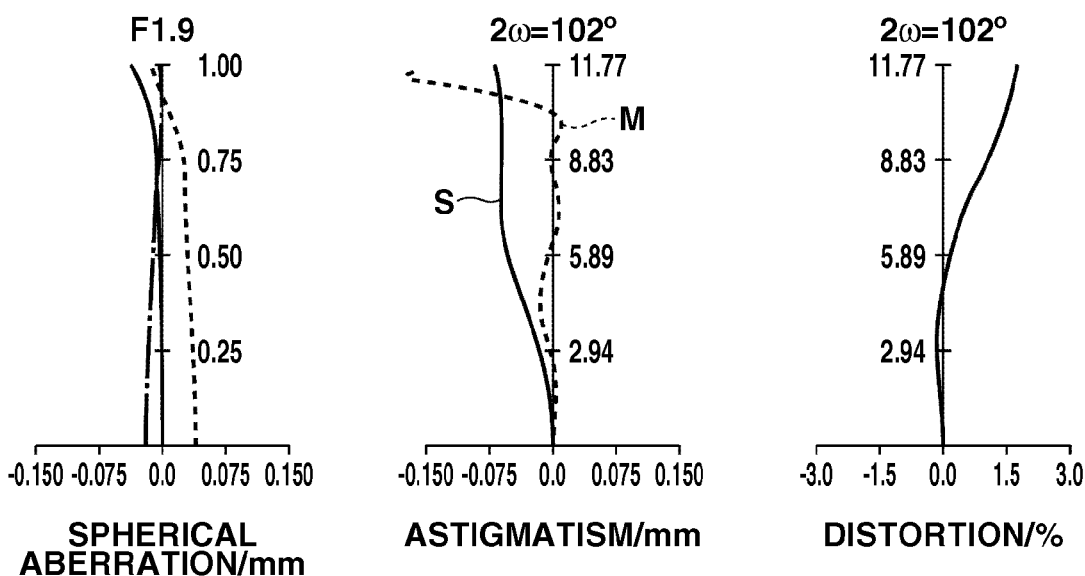
Figure 8A:
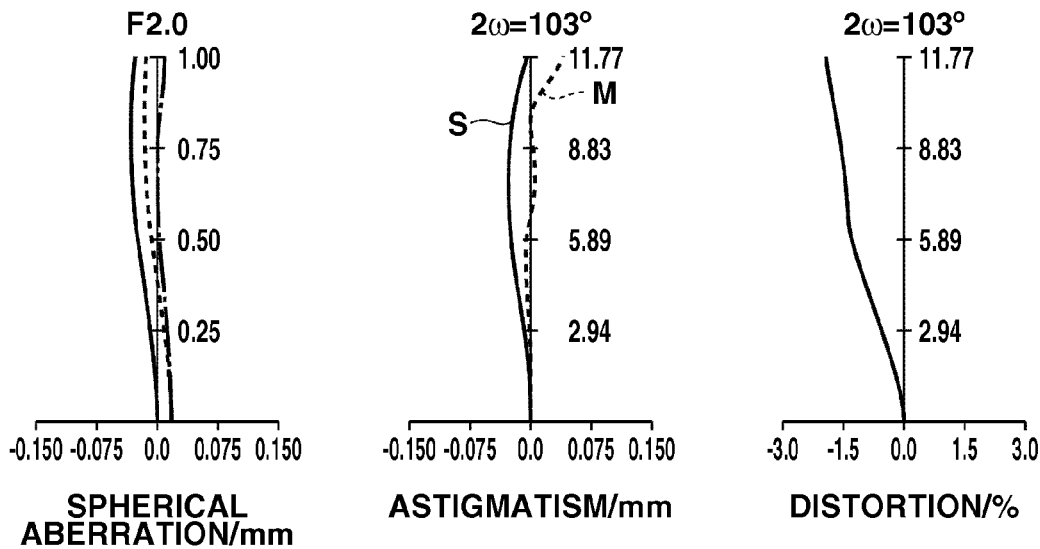
FIGS. 8A and 8B are charts illustrating various aberrations occurring in the zoom lens according to the fourth exemplary embodiment of the present invention.
Figure 8B:
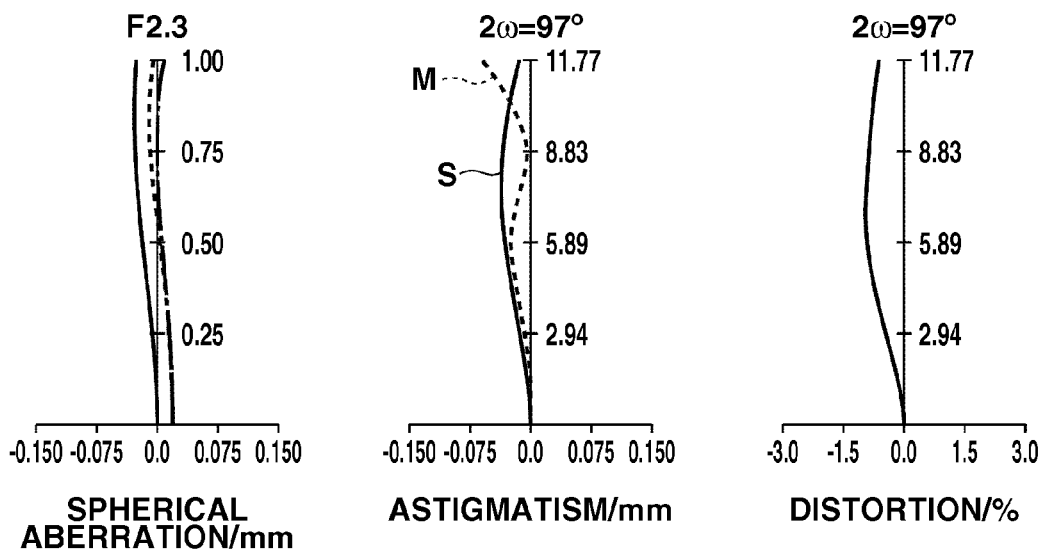

FIGS. 4A, 6A, and 8A each correspond to FIG. 2A in the first exemplary embodiment. FIGS. 4B, 6B, and 8B each correspond to FIG. 2B in the first exemplary embodiment. More specifically, FIGS. 4A, 6A, and 8A each illustrate aberration charts for the zoom lens at the wide-angle end (short focal length end) in the case where a distance to an object (the distance from the first lens unit to the object) is 0.63 m according to the second, third, and fourth exemplary embodiments of the present invention, respectively. FIGS. 4B, 6B, and 8B each illustrate aberration charts for the zoom lens at the telephoto end (long focal length end) in the case where a distance to an object (the distance from the first lens unit to the object) is 0.63 m according to the second, third, and fourth exemplary embodiments of the present invention, respectively.

In the aberration charts of FIGS. 2A, 2B, 4A, 4B, 6A, 6B, 8A, and 8B, spherical aberration indicates aberration in the case where the wavelength is 550 nm, 620 nm, and 450 nm, respectively. "S" denotes field tilt in a sagittal image plane and "M" denotes field tilt in a meridional image plane. The sagittal field tilt S, the meridional field tilt M, and distortion indicate aberration in the case where the wavelength is 550 nm. "ω" denotes a half angle of view, and "F" denotes an F-number.

In FIGS. 1, 3, 5, and 7, "S0" indicates a screen surface (a projection surface), and "LCD" indicates an original image (an image to be projected) displayed on the display panel (liquid crystal display element). The screen surface S0 and the original image LCD are conjugate with each other. In general, the screen surface S0 is a conjugate point relatively distant from the zoom lens and corresponds to the enlargement conjugate side (the front side), and the original image LCD is a conjugate point relatively close to the zoom lens and corresponds to the reduction conjugate side (the rear side).

Furthermore, in FIGS. 1, 3, 5, and 7, "GB" denotes an optical element (glass block) having substantially no optical power, such as a color composition prism (a polarizing beam splitter or a dichroic prism), a polarization filter, a wavelength plate, or a color filter. That is, the glass block GB does not have an optical power.

Here, Tables 1 through 4 are briefly described. Tables 1 through 4 describe lens data for the first through fourth exemplary embodiments, respectively.

In each of Tables 1 through 4, "i" denotes the order of an optical surface from the enlargement side (the front side), "Ri" denotes a radius of curvature of the i-th optical surface (an i-th surface), "di" denotes an axial interval between the i-th surface and the (i+1)th surface, "Ni" and "vi" respectively denote a refractive index and an Abbe number of the i-th optical material with respect to d-line light. In addition, "f" denotes the focal length, "Fno" denotes the F-number, and "ω" denotes the half angle of view. In each of the first through fourth exemplary embodiments, three surfaces from the rearmost lens constitute the glass block GB.

Furthermore, in each of Tables 1 through 4, "k" denotes a conic constant, each of "A", "B", "C", "D", and "E" denotes an aspheric coefficient, "x" denotes a displacement from a surface vertex along the optical axis in a position at a height "h" from the optical axis, and "r" denotes a paraxial radius of curvature. The aspheric shape is expressed as follows:

$$x = (h^2/r) / \left[1 + [1 - (1+k)(h/R)^2]^{1/2}\right] + Ah^4 + Bh^6 + Ch^8 + Dh^{10} + Eh^{12}.$$

Moreover, "E-Z" denotes "$10^{-Z}$".

Table 5 describes the values for the above-described conditional expressions (1) through (11) for the zoom lens according to each of the first through fourth exemplary embodiments.

Furthermore, in each of FIGS. 1, 3, 5, and 7, "PL" denotes a zoom lens. The zoom lens PL is mounted on a liquid crystal video projector body (not illustrated) via a connection member (not illustrated). Furthermore, the glass block GB and the liquid crystal display element LCD are contained in the liquid crystal video projector body.

First Exemplary Embodiment

A first exemplary embodiment of the present invention is described below. FIG. 1 illustrates components of the zoom lens according to the first exemplary embodiment. Table 1 shows the lens data for the zoom lens according to the first exemplary embodiment. FIG. 2A illustrates various aberrations occurring in the zoom lens at the wide-angle end according to the first exemplary embodiment. FIG. 2B illustrates various aberrations occurring in the zoom lens at the telephoto end according to the first exemplary embodiment. Referring to FIG. 1, the zoom lens comprises (consists of or includes) a first lens unit L1 having a negative refractive power (optical power), a second lens unit L2 having a positive refractive power (optical power), a third lens unit L3 having a positive refractive power (optical power), a fourth lens unit L4 having a negative refractive power (optical power), a fifth lens unit L5 having a positive refractive power (optical power), and a sixth lens unit L6 having a positive refractive power (optical power). "ST" denotes an aperture stop provided in the fourth lens unit L4.

During zooming from the wide-angle end to the telephoto end, the second lens unit L2, the third lens unit L3, the fourth lens unit L4, and the fifth lens unit L5 are moved independently towards the screen surface S0, as respectively indicated by arrows in FIG. 1. The first lens unit L1 and the sixth lens unit L6 do not move for zooming. Accordingly, the total length (size) of the zoom lens from the first lens unit L1 to the sixth lens unit L6 can remain constant during zooming.

The first lens unit L1 includes a negative lens G11, a positive lens G12, a negative lens G13, a negative lens G14, and a negative lens G15 in order from the front side (enlargement side) to the rear side (reduction side).

The negative lens G11 is a meniscus negative lens whose surface facing the front side has a convex shape. The positive lens G12 is a meniscus positive lens whose surface facing the front side has a convex shape. The negative lens G13 is a meniscus negative lens whose surface facing the front side has a convex shape. The negative lens G14 is a meniscus negative lens whose surface facing the front side has a convex shape. The negative lens G15 is a bi-concave negative lens.

The positive lens G12 particularly corrects distortion. By providing an aspheric surface to the negative lens G14, the first lens unit L1 can improve the effect of correcting distortion. The bi-concave negative lens G15 can effectively correct astigmatism. By using both a high dispersion glass and a low dispersion glass as lens materials of the first lens unit L1, the amount of occurrence of chromatic aberration of magnification can be reduced to a minimum.

The second lens unit L2 comprises (consists of or includes) one lens, namely, a positive lens G21 whose surfaces both have a convex shape. The positive lens G21 mainly corrects various aberrations occurring in the first lens unit L1. A material having a high refractive index is used for the positive lens G21. Thus, the second lens unit L2 corrects Petzval sum and reduces the variation of spherical aberration occurring during zooming.

In general, resolution may be degraded when curvature of field and astigmatism are large. Accordingly, it is necessary to correct Petzval sum to a minimum. Furthermore, in terms of correcting chromatic aberration, in order to effectively correcting chromatic aberration of magnification occurring in the first lens unit L1, a material having a high refractive index and a low dispersion property is used as the material of the second lens unit L2.

The third lens unit L3 includes a positive lens G31 whose both surfaces each have a convex shape and a meniscus negative lens G32 whose surface facing the rear side has a convex shape, which are cemented together. The third lens unit L3 mainly performs zooming. In order to reduce the amount of variation of chromatic aberration of magnification occurring due to zooming, a glass material having a high refractive index is used for the positive lens G31 and the negative lens G32, and the difference between the Abbe number of the positive lens G31 and that of the negative lens G32 is large in the third lens unit L3.

The fourth lens unit L4 includes, in order from the front side to the rear side, a meniscus negative lens G41 whose surface facing the rear side has a convex shape and a cemented lens including a biconvex positive lens G42 and a biconcave negative lens G43. The fourth lens unit L4 includes the negative lens G41 having a large negative refractive power to reduce Petzval sum. Using the cemented lens including the positive lens G42 and the negative lens G43, the fourth lens unit L4 can effectively correct spherical aberration.

The aperture stop ST is provided in the fourth lens unit L4. Thus, the fourth lens unit L4 reduces or suppresses the variation of off-axis aberration occurring due to zooming. However, the aperture stop ST can be provided in a portion of the zoom lens other than the fourth lens unit L4. The aperture stop ST can optionally be moved independently of any lens unit.

The fifth lens unit L5 includes, in order from the front side to the rear side, a cemented lens including a positive lens G51 both of whose surfaces have a convex shape and a negative lens G52 both of whose surfaces have a concave shape and a positive lens G53 both of whose surfaces have a convex shape. A low dispersion glass is used as the material of the positive lens 51 of the cemented lens and the positive lens G53. Thus, the fifth lens unit L5 can reduce or suppress chromatic aberration.

The sixth lens unit L6 includes a meniscus positive lens G61 whose surface facing the rear side has a convex shape. A low dispersion glass is used as the material of the positive lens G61, and the positive lens G61 has a large refractive power (optical power). Thus, the sixth lens unit L6 can improve the telecentricity of the zoom lens. The positive lens G61 of the sixth lens unit L6 has an aspheric surface to effectively correct coma.

Second Exemplary Embodiment

A second exemplary embodiment of the present invention is described below. FIG. 3 illustrates components of the zoom lens according to the second exemplary embodiment. Table 2 shows the lens data for the zoom lens according to the second exemplary embodiment. FIG. 4A illustrates various aberrations occurring in the zoom lens at the wide-angle end according to the second exemplary embodiment. FIG. 4B illustrates various aberrations occurring in the zoom lens at the telephoto end according to the second exemplary embodiment. Referring to FIG. 3, the zoom lens comprises (consists of or includes) a first lens unit L1 having a negative refractive power (optical power), a second lens unit L2 having a positive refractive power (optical power), a third lens unit L3 having a positive refractive power (optical power), a fourth lens unit L4 having a negative refractive power (optical power), a fifth lens unit L5 having a positive refractive power (optical power), and a sixth lens unit L6 having a positive refractive power (optical power). "ST" denotes an aperture stop provided in the fourth lens unit L4.

During zooming from the wide-angle end to the telephoto end, the second lens unit L2, the third lens unit L3, and the fourth lens unit L4 are moved independently towards the screen surface S0, and the fifth lens unit L5 is moved independently towards the liquid crystal display element LCD, as respectively indicated by arrows in FIG. 3. The first lens unit L1 and the sixth lens unit L6 do not move for zooming. Accordingly, the total length (size) of the zoom lens from the first lens unit L1 to the sixth lens unit L6 is constant during zooming.

The first lens unit L1 includes, in order from the front side (enlargement side) to the rear side (reduction side), a meniscus negative lens G11 whose surface facing the front side has a convex shape, a meniscus negative lens G12 whose surface facing the front side has a convex shape, a meniscus negative lens G13 whose surface facing the front side has a convex shape, and a negative lens G14 whose both surfaces each have a concave shape. The negative lens G13 has an aspheric surface. Thus, the first lens unit L1 can improve the effect of correcting distortion. Using the negative lens G14 both of whose surfaces have a concave shape, the first lens unit L1 can effectively correct astigmatism.

The second lens unit L2 comprises (consists of or includes) one lens, namely, a positive lens G21, both of whose surfaces have a convex shape. The positive lens G21 mainly corrects various aberrations occurring in the first lens unit L1. A material having a high refractive index is used for the positive lens G21. Thus, the second lens unit L2 corrects Petzval sum and effectively reduces the variation of various aberrations, such as spherical aberration, occurring during zooming.

In general, resolution may be degraded when curvature of field and astigmatism are large. Accordingly, it is necessary to correct Petzval sum to a minimum. Furthermore, in terms of correcting chromatic aberration, in order to effectively correcting chromatic aberration of magnification occurring in the first lens unit L1, a material having a high refractive index and a low dispersion property is used as the material of the second lens unit L2.

The third lens unit L3 includes a positive lens G31 both of whose surfaces have a convex shape, and a meniscus negative lens G32 whose surface facing the rear side has a convex shape, which are cemented together. The third lens unit L3 mainly performs zooming. In order to reduce the amount of variation of chromatic aberration of magnification occurring due to zooming, a glass material having a high refractive index is used for the positive lens G31 and the negative lens G32, and the difference between the Abbe number of the positive lens G31 and that of the negative lens G32 is large in the third lens unit L3.

The fourth lens unit L4 includes a cemented lens including a meniscus positive lens G41 whose surface facing the rear side has a convex shape and a negative lens G42 both of whose surfaces have a concave shape. Using the cemented lens including the positive lens G41 and the negative lens G42, the fourth lens unit L4 can reduce or suppress the occurrence of various aberrations and reduce Petzval sum. The aperture stop ST is provided in the fourth lens unit L4. Thus, the fourth lens unit L4 reduces or suppresses off-axis aberration occurring due to zooming. However, the aperture stop ST can be provided in a portion of the zoom lens other than the fourth lens unit L4. The aperture stop ST can optionally be moved independently of any lens unit.

The fifth lens unit L5 includes, in order from the front side to the rear side, a cemented lens including a positive lens G51 both of whose surfaces have a convex shape and a meniscus negative lens G52 whose surface facing the rear side has a convex shape and a positive lens G53 both of whose surfaces have a convex shape. A low dispersion glass is used as the material of the positive lens 51 of the cemented lens and the positive lens G53. Thus, the fifth lens unit L5 can reduce or suppress chromatic aberration.

The sixth lens unit L6 includes a meniscus positive lens G61 whose surface facing the rear side has a convex shape. A low dispersion glass is used as the material of the positive lens G61, and the positive lens G61 has a large refractive power (optical power). Thus, the sixth lens unit L6 can improve the telecentricity of the zoom lens. The positive lens G61 of the sixth lens unit L6 has an aspheric surface to effectively correct coma.

Third Exemplary Embodiment

A third exemplary embodiment of the present invention is described below. FIG. 5 illustrates components of the zoom lens according to the third exemplary embodiment. Table 3 shows the lens data for the zoom lens according to the third exemplary embodiment. FIG. 6A illustrates various aberrations occurring in the zoom lens at the wide-angle end according to the third exemplary embodiment. FIG. 6B illustrates various aberrations occurring in the zoom lens at the telephoto end according to the third exemplary embodiment. Referring to FIG. 5, the zoom lens comprises (consists of or includes) a first lens unit L1 having a negative refractive power (optical power), a second lens unit L2 having a positive refractive power (optical power), a third lens unit L3 having a positive refractive power (optical power), a fourth lens unit L4 having a negative refractive power (optical power), and a fifth lens unit L5 having a positive refractive power (optical power). "ST" denotes an aperture stop provided in the fourth lens unit L4.

During zooming from the wide-angle end to the telephoto end, the second lens unit L2 and the third lens unit L3 are moved independently towards the screen surface S0, and the fourth lens unit L4 is moved independently towards the liquid crystal display element LCD, as respectively indicated by arrows in FIG. 5. The first lens unit L1 and the fifth lens unit L5 do not move for zooming. Accordingly, the total length (size) of the zoom lens from the first lens unit L1 to the fifth lens unit L5 is constant during zooming.

The first lens unit L1 includes, in order from the front side (enlargement side) to the rear side (reduction side), a meniscus negative lens G11 whose surface facing the front side has a convex shape, a meniscus negative lens G12 whose surface facing the front side has a convex shape, a meniscus negative lens G13 whose surface facing the front side has a convex shape, and a negative lens G14 both of whose surfaces have a concave shape. The negative lens G13 has an aspheric surface. Thus, the first lens unit L1 can improve the effect of correcting distortion. Using the negative lens G14 both of whose surfaces have a concave shape, the first lens unit L1 can effectively correct astigmatism.

The second lens unit L2 includes one lens, namely, a positive lens G21 whose both surfaces each have a convex shape. The positive lens G21 mainly corrects various aberrations occurring in the first lens unit L1. A material having a high refractive index is used for the positive lens G21. Thus, the second lens unit L2 corrects Petzval sum and effectively reduces the variation of various aberrations, such as spherical aberration, occurring during zooming.

In general, resolution may be degraded when curvature of field and astigmatism are large. Accordingly, it is necessary to correct Petzval sum to a minimum. Furthermore, in terms of correcting chromatic aberration, in order to effectively correct chromatic aberration of magnification occurring in the first lens unit L1, a material having a high refractive index and a low dispersion property is used as the material of the second lens unit L2.

The third lens unit L3 comprises (consists of or includes) a positive lens G31 whose both surfaces each have a convex shape and a meniscus negative lens G32 whose surface facing the rear side has a convex shape, which are cemented together. The third lens unit L3 mainly performs zooming. In order to reduce the amount of variation of chromatic aberration of magnification occurring due to zooming, a glass material having a high refractive index is used for the positive lens G31 and the negative lens G32, and the difference between the Abbe number of the positive lens G31 and that of the negative lens G32 is large in the third lens unit L3.

The fourth lens unit L4 comprises (consists of or includes) a cemented lens including a meniscus positive lens G41 whose surface facing the rear side has a convex shape and a negative lens G42 whose both surfaces each have a concave shape. Using the cemented lens including the positive lens G41 and the negative lens G42, the fourth lens unit L4 can reduce or suppress the occurrence of various aberrations and reduce Petzval sum. The aperture stop ST is provided in the fourth lens unit L4. Thus, the fourth lens unit L4 reduces or suppresses off-axis aberration occurring due to zooming. However, the aperture stop ST can be provided to a portion of the zoom lens other than the fourth lens unit L4. The aperture stop ST can optionally be moved independently of any lens unit.

The fifth lens unit L5 comprises (consists of or includes), in order from the front side to the rear side, a cemented lens including a positive lens G51 whose both surfaces each have a convex shape and a meniscus negative lens G52 whose surface facing the rear side has a convex shape, a positive lens G53 whose both surfaces each have a convex shape, and a meniscus positive lens G54 whose surface facing the rear side has a convex shape. A low dispersion glass is used as the material of the positive lens 51 of the cemented lens and the positive lens G53. Furthermore, the positive lens G51 has a large refractive power (optical power) to improve the telecentricity of the zoom lens. Thus, the fifth lens unit L5 can effectively correct various aberrations, particularly, coma.

Fourth Exemplary Embodiment

A fourth exemplary embodiment of the present invention is described below. FIG. 7 illustrates components of the zoom lens according to the fourth exemplary embodiment. Table 4 shows the lens data for the zoom lens according to the fourth exemplary embodiment. FIG. 8A illustrates various aberrations occurring in the zoom lens at the wide-angle end according to the fourth exemplary embodiment. FIG. 8B illustrates various aberrations occurring in the zoom lens at the telephoto end according to the fourth exemplary embodiment. Referring to FIG. 7, the zoom lens comprises (consists of or includes) a first lens unit L1 having a negative refractive power (optical power), a second lens unit L2 having a positive refractive power (optical power), a third lens unit L3 having a positive refractive power (optical power), a fourth lens unit L4 having a negative refractive power (optical power), and a fifth lens unit L5 having a positive refractive power (optical power). "ST" denotes an aperture stop provided in the fourth lens unit L4.

During zooming from the wide-angle end to the telephoto end, the second lens unit L2, the third lens unit L3, and the fourth lens unit L4 are moved independently towards the screen surface S0, as respectively indicated by arrows in FIG. 7. The first lens unit L1 and the fifth lens unit L5 do not move for zooming. Accordingly, the total length (size) of the zoom lens from the first lens unit L1 to the fifth lens unit L5 is constant.

The first lens unit L1 includes, in order from the front side (enlargement side) to the rear side (reduction side), a meniscus positive lens G11 whose surface facing the front side has a convex shape, a meniscus negative lens G12 whose surface facing the front side has a convex shape, a meniscus negative lens G13 whose surface facing the front side has a convex shape, a meniscus negative lens G14 whose surface facing the front side has a convex shape, and a negative lens G15 both of whose surfaces have a concave shape. The positive lens G11 particularly corrects distortion. The negative lens G13 has an aspheric surface. Thus, the first lens unit L1 can improve the effect of correcting distortion. Using the biconcave negative lens G15, the first lens unit L1 can effectively correct astigmatism.

The second lens unit L2 comprises (consists of) one lens, namely, a biconvex positive lens G21. The positive lens G21 mainly corrects various aberrations occurring in the first lens unit L1. A material having a high refractive index is used for the positive lens G21. Thus, the second lens unit L2 effectively corrects spherical aberration and coma. Furthermore, in terms of correcting chromatic aberration, the second lens unit L2 effectively corrects chromatic aberration of magnification occurring in the first lens unit L1.

The third lens unit L3 includes a positive lens G31 both of whose surfaces have a convex shape and a meniscus negative lens G32 whose surface facing the rear side has a convex shape, which are cemented together. The third lens unit L3 mainly performs zooming. In order to reduce the amount of variation of chromatic aberration of magnification occurring due to zooming, the difference between the Abbe number of the positive lens G31 and that of the negative lens G32 is large in the third lens unit L3.

The fourth lens unit L4 includes a cemented lens including a positive lens G41 both of whose surfaces have a convex shape and a meniscus negative lens G42 whose surface facing the rear side has a convex shape. Using the cemented lens including the positive lens G41 and the negative lens G42, the fourth lens unit L4 can reduce or suppress the occurrence of various aberrations and reduce Petzval sum. The aperture stop ST is provided in the fourth lens unit L4. Thus, the fourth lens unit L4 reduces or suppresses off-axis aberration occurring due to zooming. However, the aperture stop ST can be provided to a portion of the zoom lens other than the fourth lens unit L4. The aperture stop ST can optionally be moved independently of any lens unit.

The fifth lens unit L5 includes, in order from the front side to the rear side, a cemented lens including a meniscus positive lens G51 whose surface facing the rear side has a convex shape and a meniscus negative lens G52 whose surface facing the rear side has a convex shape, a positive lens G53 both of whose surfaces have a convex shape, and a meniscus positive lens G54 whose surface facing the rear side has a convex shape. A low dispersion glass is used as the material of the positive lens 51 of the cemented lens and the positive lens G53. Furthermore, the positive lens G51 has a large refractive power (optical power) to improve the telecentricity of the zoom lens. Thus, the fifth lens unit L5 can effectively correct various aberrations, particularly, coma.

In each of the above-described exemplary embodiments of the present invention, the material of an aspheric lens is not limited to a plastic material or a glass material. That is, a hybrid type aspheric lens having a thin resin layer (resin material) formed on an optical surface of the spherical lens made of a glass material to form an aspheric surface thereof can be used.

With the above-described configuration, each of the exemplary embodiments of the present invention can perform a projection with a wide angle of view in which the half angle of view is 50 degrees or wider. Thus, according to the exemplary embodiments of the present invention, a zoom lens useful in a liquid crystal projector can be achieved having a high optical performance effectively correcting various aberrations occurring due to zooming.

Figure 9:
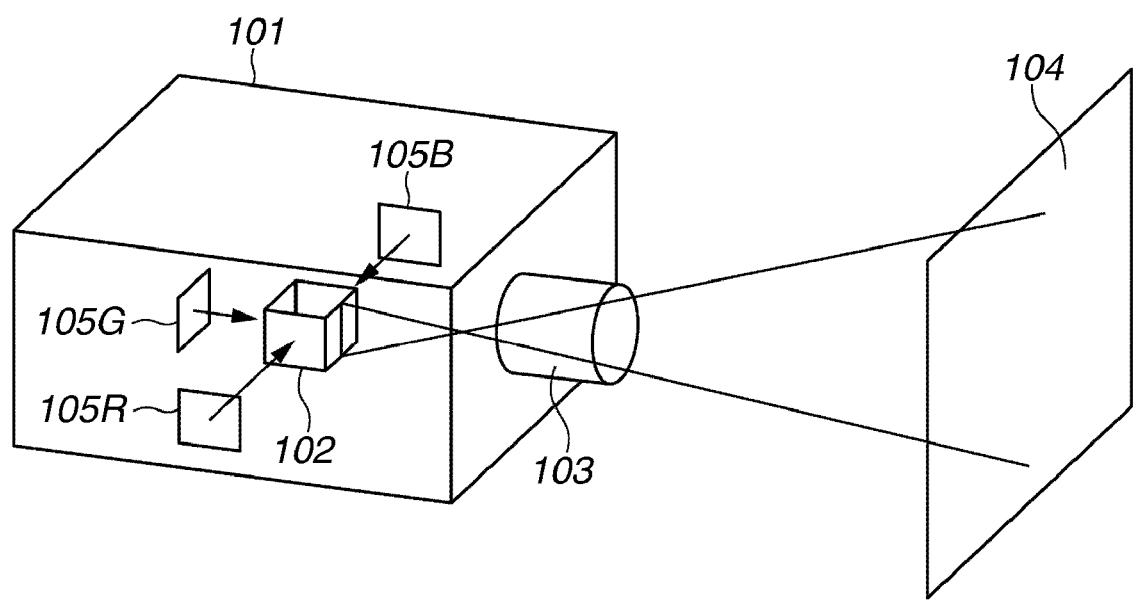
FIG. 9 is a diagram schematically illustrating the entire image projection apparatus according to an exemplary embodiment of the present invention.

FIG. 9 is a diagram schematically illustrating components of the image projection apparatus according to an exemplary embodiment of the present invention.

Referring to FIG. 9, the above-described zoom lens is applied to a three-plate type color liquid crystal projector 101. In the example in FIG. 9, image information (image light) having a plurality of color light fluxes based on a plurality of display panels (image display elements or liquid crystal display elements) 105R, 105G, and 105B is combined by a color combining unit 102. The combined image information is enlarged and projected onto a screen surface (projection surface) 104 by a zoom lens 103. As the zoom lens 103, a zoom lens according to the above-described first through fourth exemplary embodiments can be used.

The image projection apparatus in FIG. 9 projects a color image onto the projection surface by using three display panels 105R, 105G, and 105B. Three display panels 105R, 105G, and 105B receive illumination light emitted from a light source (not illustrated), modulate (changes a polarization direction, changes a reflection direction, or changes a transmission direction of the light) the received illumination light, and guide the modulated light flux to the color combining unit 102. The color combining unit 102, such as a prism, combines image light fluxes, whose color differs from one another or whose wavelength differs from one another, from the display panels 105R, 105G, and 105B into one optical path. The combined image light is projected onto the screen surface (projection surface) 104 via the zoom lens (projection lens) 103.

In the example of the image projection apparatus illustrated in FIG. 9, the display panels (image display elements or liquid crystal display elements) 105R, 105G, and 105B can be either transmission-type display panels or reflection-type display panels.

In addition, the zoom lens according to the exemplary embodiments of the present invention can be applied to an image pickup apparatus, such as a film camera, a video camera, or a digital still camera, which is configured to form an image on a silver-halide film or a solid-state image sensor (photoelectric conversion element), such as a charge-coupled device (CCD) sensor or a complementary metal oxide semiconductor (CMOS) sensor.

According to the above-described exemplary embodiments of the present invention, a zoom lens can be implemented having a wide angle of view whose half angle of view is 50 degrees or greater, capable of effectively correcting various aberrations occurring due to zooming, and having a high optical performance. In addition, according to the above-described exemplary embodiments of the present invention, a large-diameter zoom lens can be implemented having a long back focal distance, capable of effectively correcting various aberrations, and having telecentricity.

TABLE 1

First Exemplary Embodiment f = 8.2-9.9 mm Fno = 1.9-2.2

| | | | |
|---|---|---|---|
| R1 = 78.009 | d1 = 5.800 | N1 = 1.83400 | ν1 = 37.2 |
| R2 = 45.394 | d2 = 12.968 | | |
| R3 = 84.627 | d3 = 5.700 | N2 = 1.84666 | ν2 = 23.8 |
| R4 = 102.000 | d4 = 0.600 | | |
| R5 = 75.930 | d5 = 3.500 | N3 = 1.83400 | ν3 = 37.2 |
| R6 = 34.114 | d6 = 8.006 | | |
| *R7 = 136.613 | d7 = 3.500 | N4 = 1.52996 | ν4 = 55.8 |
| *R8 = 29.630 | d8 = 17.026 | | |
| R9 = −54.652 | d9 = 2.700 | N5 = 1.69680 | ν5 = 55.5 |
| R10 = 77.677 | d10 = Variable | | |
| R11 = 222.213 | d11 = 9.500 | N6 = 1.83400 | ν6 = 37.2 |
| R12 = −87.459 | d12 = Variable | | |
| R13 = 95.216 | d13 = 15.000 | N7 = 1.83400 | ν7 = 37.2 |
| R14 = −49.911 | d14 = 2.500 | N8 = 1.84666 | ν8 = 23.8 |
| R15 = −160.223 | d15 = Variable | | |
| R16 = −29.741 | d16 = 1.600 | N9 = 1.84666 | ν9 = 23.8 |
| R17 = −77.424 | d17 = 0.600 | | |
| R18 = Stop | d18 = 3.946 | | |
| R19 = 68.747 | d19 = 4.261 | N10 = 1.74077 | ν10 = 27.8 |
| R20 = −14.475 | d20 = 1.500 | N11 = 1.83400 | ν11 = 37.2 |
| R21 = 62.155 | d21 = Variable | | |
| R22 = 54.696 | d22 = 6.973 | N12 = 1.48749 | ν12 = 70.2 |
| R23 = −17.825 | d23 = 1.500 | N13 = 1.84666 | ν13 = 23.8 |
| R24 = −39.866 | d24 = 0.150 | | |
| R25 = 88.677 | d25 = 6.367 | N14 = 1.48749 | ν14 = 70.2 |
| R26 = −26.695 | d26 = Variable | | |
| *R27 = −367.912 | d27 = 4.200 | N15 = 1.58313 | ν15 = 59.4 |
| *R28 = −34.609 | d28 = 1.000 | | |
| R29 = ∞ | d29 = 27.500 | N16 = 1.51633 | ν16 = 64.1 |
| R30 = ∞ | d30 = 9.315 | | |

| | Focal Length | |
|---|---|---|
| Variable Space | Wide | Tele |
| d10 | 17.158 | 15.689 |
| d12 | 22.885 | 17.061 |
| d15 | 40.672 | 46.050 |
| d21 | 4.655 | 0.912 |
| d26 | 0.500 | 6.157 |

Aspheric Coefficients

| | | | | |
|---|---|---|---|---|
| *R7: | 1/r = 7.320E−03 | K = 0 | A = 1.824E−05 | B = −3.213E−08 |
| | C = 3.673E−11 | D = −2.397E−14 | E = 9.314E−18 | |
| *R8: | 1/r = 3.375E−02 | K = 0 | A = 9.893E−06 | B = −3.337E−08 |
| | C = 1.024E−11 | D = 1.865E−14 | E = −1.517E−17 | |

TABLE 1-continued

First Exemplary Embodiment

| | | | | |
|---|---|---|---|---|
| *R27: | 1/r = −2.718E−03 | K = 0 | A = −2.433E−05 | B = −4.817E−08 |
| | C = −2.374E−11 | D = −8.921E−13 | E = 2.211E−17 | |
| *R28: | 1/r = −2.889E−02 | K = 0 | A = −6.596E−06 | B = −3.374E−08 |
| | C = −6.654E−11 | D = −4.123E−13 | E = −1.730E−16 | |

TABLE 2

Second Exemplary Embodiment f = 8.1-9.4 mm Fno = 1.8-1.9

| | | | |
|---|---|---|---|
| R1 = 75.031 | d1 = 4.100 | N1 = 1.69680 | ν1 = 55.5 |
| R2 = 38.911 | d2 = 10.336 | | |
| R3 = 61.593 | d3 = 3.500 | N2 = 1.72000 | ν2 = 50.2 |
| R4 = 31.037 | d4 = 10.753 | | |
| *R5 = 179.444 | d5 = 3.584 | N3 = 1.52996 | ν3 = 55.8 |
| *R6 = 30.625 | d6 = 14.441 | | |
| R7 = −120.265 | d7 = 2.700 | N4 = 1.48749 | ν4 = 70.2 |
| R8 = 44.302 | d8 = Variable | | |
| R9 = 202.658 | d9 = 9.500 | N5 = 1.83400 | ν5 = 37.2 |
| R10 = −76.773 | d10 = Variable | | |
| R11 = 187.758 | d11 = 9.510 | N6 = 1.69680 | ν6 = 55.5 |
| R12 = −43.332 | d12 = 2.500 | N7 = 1.84666 | ν7 = 23.8 |
| R13 = −73.807 | d13 = Variable | | |
| R14 = Stop | d14 = 0.803 | | |
| R15 = −44.561 | d15 = 3.474 | N8 = 1.7552 | ν8 = 27.5 |
| R16 = −14.934 | d16 = 1.600 | N9 = 1.83400 | ν9 = 37.2 |
| R17 = 306.044 | d17 = Variable | | |
| R18 = 57.121 | d18 = 7.487 | | |
| R19 = −13.685 | d19 = 1.600 | N10 = 1.83400 | ν10 = 37.2 |
| R20 = −63.117 | d20 = 0.150 | | |
| R21 = 56.705 | d21 = 8.000 | N11 = 1.49700 | ν11 = 81.6 |
| R22 = −22.638 | d22 = Variable | | |
| *R23 = −190.571 | d23 = 4.500 | N12 = 1.58313 | ν12 = 59.4 |
| *R24 = −27.119 | d24 = 1.000 | | |
| R25 = ∞ | d25 = 27.500 | N13 = 1.51633 | ν13 = 64.1 |
| R26: = ∞ | d26 = 9.330 | | |

| | Focal Length | |
|---|---|---|
| Variable Space | Wide | Tele |
| d8 | 25.117 | 21.931 |
| d10 | 43.108 | 35.307 |
| d13 | 25.812 | 37.502 |
| d17 | 1.711 | 1.024 |
| d22 | 0.714 | 0.700 |

Aspheric Coefficients

| | | | | |
|---|---|---|---|---|
| *R5: | 1/r = 5.573E−03 | K = 0 | A = 2.820E−05 | B = −4.779E−08 |
| | C = 5.441E−11 | D = −3.651E−14 | E = 9.183E−18 | |
| *R6: | 1/r = 3.265E−02 | K = 0 | A = 2.246E−05 | B = −4.818E−08 |
| | C = 1.858E−11 | D = −6.011E−15 | E = −4.176E−18 | |
| *R23: | 1/r = −5.247E−03 | K = 0 | A = −2.130E−05 | B = −6.953E−08 |
| | C = 4.282E−10 | D = −1.274E−12 | E = 2.194E−17 | |
| *R24: | 1/r = −3.688E−02 | K = 0 | A = 4.511E−06 | B = −4.771E−08 |
| | C = 3.467E−10 | D = −7.829E−13 | E = −1.733E−16 | |

TABLE 3

Third Exemplary Embodiment f = 8.1-9.4 mm Fno = 1.8-1.9

| | | | |
|---|---|---|---|
| R1 = 74.615 | d1 = 4.500 | N1 = 1.69680 | ν1 = 55.5 |
| R2 = 39.928 | d2 = 10.036 | | |
| R3 = 60.548 | d3 = 3.979 | N2 = 1.80610 | ν2 = 40.9 |
| R4 = 31.709 | d4 = 12.063 | | |
| *R5 = 145.091 | d5 = 4.100 | N3 = 1.52996 | ν3 = 55.8 |
| *R6 = 29.343 | d6 = 14.395 | | |
| R7 = −126.313 | d7 = 2.700 | N4 = 1.48749 | ν4 = 70.2 |
| R8 = 47.436 | d8 = Variable | | |

TABLE 3-continued

Third Exemplary Embodiment

| R9 = 409.828 | d9 = 9.500 | N5 = 1.83400 | ν5 = 37.2 |
| R10 = −79.798 | d10 = Variable | | |
| R11 = 175.525 | d11 = 12.500 | N6 = 1.69680 | ν6 = 55.5 |
| R12 = −50.802 | d12 = 2.500 | N7 = 1.84666 | ν7 = 23.8 |
| R13 = −86.365 | d13 = Variable | | |
| R14 = Stop | d14 = 0.851 | | |
| R15 = −43.509 | d15 = 2.731 | N8 = 1.75520 | ν8 = 27.5 |
| R16 = −19.132 | d16 = 1.700 | N9 = 1.83400 | ν8 = 37.2 |
| R17 = −289.070 | d17 = Variable | | |
| R18 = 55.338 | d18 = 7.096 | N10 = 1.48749 | ν10 = 70.2 |
| R19 = −14.010 | d19 = 1.700 | N11 = 1.83400 | ν11 = 37.2 |
| R20 = −153.978 | d20 = 0.150 | | |
| R21 = 50.383 | d21 = 8.000 | N12 = 1.48749 | ν12 = 70.2 |
| R22 = −22.123 | d22 = 0.636 | | |
| *R23 = −177.536 | d23 = 4.500 | N13 = 1.58313 | ν13 = 59.4 |
| *R24 = −26.275 | d24 = 1.000 | | |
| R25 = ∞ | d25 = 27.500 | N14 = 1.51633 | ν14 = 64.1 |
| R26 = ∞ | d26 = 9.306 | | |

| | Focal Length | |
|---|---|---|
| Variable Space | Wide | Tele |
| d8 | 32.092 | 28.791 |
| d10 | 41.461 | 36.120 |
| d13 | 36.410 | 48.051 |
| d17 | 3.400 | 0.400 |

Aspheric Coefficients

| *R5: | 1/r = 6.892E−03 | K = 0 | A = 2.160E−05 | B = −3.663E−08 |
| | C = 4.387E−11 | D = −3.115E−14 | E = 8.363E−18 | |
| *R6: | 1/r = 3.408E−02 | K = 0 | A = 1.525E−05 | B = −3.888E−08 |
| | C = 1.461E−11 | D = −2.185E−15 | E = −1.166E−17 | |
| *R23: | 1/r = −5.633E−03 | K = 0 | A = −2.248E−05 | B = −5.030E−08 |
| | C = 4.489E−10 | D = −9.061E−13 | E = 2.194E−17 | |
| *R24: | 1/r = −3.806E−02 | K = 0 | A = 4.398E−06 | B = −3.465E−08 |
| | C = 3.882E−10 | D = −5.031E−13 | E = 0.000E+00 | |

TABLE 4

Fourth Exemplary Embodiment f = 9.3-10.2 mm Fno = 2.0-2.3

| R1 = 106.481 | d1 = 6.400 | N1 = 1.74077 | ν1 = 27.8 |
| R2 = 145.000 | d2 = 0.150 | | |
| R3 = 68.727 | d3 = 4.100 | N2 = 1.84666 | ν2 = 23.8 |
| R4 = 31.767 | d4 = 8.763 | | |
| *R5 = 99.685 | d5 = 3.500 | N3 = 1.52996 | ν3 = 55.8 |
| *R6 = 29.386 | d6 = 9.515 | | |
| R7 = 120.558 | d7 = 3.500 | N47 = 1.69680 | ν4 = 55.5 |
| R8 = 28.968 | d8 = 9.933 | | |
| R9 = −92.269 | d9 = 3.705 | N5 = 1.69680 | ν5 = 55.5 |
| R10 = 92.702 | d10 = Variable | | |
| R11 = 155.245 | d11 = 8.500 | N6 = 1.64769 | ν6 = 33.8 |
| R12 = −92.534 | d12 = Variable | | |
| R13 = 73.985 | d13 = 12.500 | | |
| R14 = −60.268 | d14 = 4.000 | N7 = 1.84666 | ν7 = 23.8 |
| R15 = −137.186 | d15 = Variable | | |
| R16 = Stop | d16 = 0.150 | | |
| R17 = 208.882 | d17 = 3.312 | N8 = 1.48749 | ν8 = 70.2 |
| R18 = −24.990 | d18 = 1.600 | N9 = 1.84666 | ν9 = 23.8 |
| R19 = −45.160 | d19 = Variable | | |
| R20 = −47.206 | d20 = 5.727 | N10 = 1.48749 | ν10 = 70.2 |
| R21 = −16.000 | d21 = 1.600 | N11 = 1.84666 | ν11 = 23.8 |
| R22 = −166.548 | d22 = 4.075 | | |
| R23 = 44.046 | d23 = 9.000 | N12 = 1.49700 | ν12 = 81.6 |
| R24 = −28.149 | d24 = 0.500 | | |
| *R25 = −316.050 | d25 = 4.500 | N13 = 1.58313 | ν13 = 59.4 |
| *R26 = −33.611 | d26 = 1.000 | | |
| R27 = 0.000 | d27 = 27.500 | N14 = 1.51633 | ν14 = 64.1 |
| R28 = 0.000 | d28 = 9.312 | | |

TABLE 4-continued

Fourth Exemplary Embodiment

| | Focal Length | |
|---|---|---|
| Variable Space | Wide | Tele |
| d10 | 27.290 | 24.867 |
| d12 | 12.614 | 8.924 |
| d15 | 47.554 | 45.204 |
| d19 | 1.704 | 10.168 |

Aspheric Coefficients

| *R5: | 1/r = 1.003E−02 | K = 0 | A = 1.245E−05 | B = −9.670E−09 |
|---|---|---|---|---|
| | C = 3.788E−12 | D = 1.705E−15 | E = −2.315E−18 | |
| *R6: | 1/r = 3.403E−02 | K = 0 | A = 8.336E−06 | B = −2.795E−09 |
| | C = −1.518E−11 | D = −1.935E−15 | E = −9.589E−18 | |
| *R25: | 1/r = −3.164E−03 | K = 0 | A = −1.334E−05 | B = −4.489E−08 |
| | C = 2.470E−10 | D = −6.757E−13 | E = 4.489E−16 | |
| *R26: | 1/r = −2.975E−02 | K = 0 | A = 4.396E−06 | B = −3.182E−08 |
| | C = 2.084E−10 | D = −4.171E−13 | E = 1.522E−16 | |

TABLE 5

| Conditional | Exemplary Embodiments | | | |
|---|---|---|---|---|
| Expression | 1 | 2 | 3 | 4 |
| (1) | −1.57 | −1.81 | −1.83 | −1.39 |
| (2) | −4.28 | −3.65 | −3.67 | −4.29 |
| (3) | −6.5 | −6.1 | −6.1 | −6.9 |
| (4) | 7.92 | 6.52 | 6.41 | 6.89 |
| (5) | 1.84666 | — | — | 1.74077 |
| (6) | 23.8 | — | — | 27.8 |
| (7) | 0.0163 | — | — | 0.0118 |
| (8) | 9.25 | 8.48 | — | — |
| (9) | 9.09 | 10.72 | — | — |
| (10) | — | — | 9.88 | 9.72 |
| (11) | — | — | 11.58 | 9.04 |

As described above, each of the above-described exemplary embodiments of the present invention having the above-described configuration can provide a zoom lens having an angle of view wider than that of a conventional zoom lens.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-152704 filed Jun. 8, 2007, which is hereby incorporated by reference herein in its entirety.

What is claimed is:

1. A zoom lens including a first lens unit having a negative optical power located at a position closest to an enlargement side,
   wherein the focal length of the zoom lens at the wide-angle end (fw) and the focal length of the first lens unit (f1) satisfy the following condition:

$-2.50 < f1/fw < -1.36$, wherein the first lens unit includes one or more negative lenses having an aspheric surface, and
   wherein the largest of the effective diameters of the aspheric surfaces of the one or more negative lenses ($\phi$max) and the focal length of the first lens unit (f1) satisfy the following condition:

$-9.0 < \phi max/f1 < -3.0$.

2. A zoom lens according to claim 1, wherein the first lens unit includes one or more negative lenses having an aspheric surface, and
   wherein a focal length of a first aspheric surface of the aspheric surfaces of the one or more negative lenses (f1asp) and a distance in a direction of an optical axis between a position of the first aspheric surface on the optical axis and a position of the first aspheric surface through which an outermost off-axis ray passes (Rdepth) satisfy the following condition:

$-10.0 < Rdepth/f1asp < -4.0$.

3. A zoom lens according to claim 1, wherein the first lens unit includes one positive lens, and
   wherein the positive lens satisfies the following conditions:

$1.63 < nd$ $vd < 35$ $0.008 < \theta gF - (0.644 - 0.00168vd) < 0.040$ where $vd = (nd-1)/(nF-nC)$
   $\theta gF = (ng-nF)/(nF-nC)$
   where "nd", "ng", "nF", and "nC" denote refractive indices of the material of the positive lens with respect to d-line light, having a wavelength of 587.56 nm, g-line light, having a wavelength of 435.84 nm, F-line light, having a wavelength of 486.13 nm, and C-line light, having a wavelength of 656.28 nm, respectively.

4. A zoom lens according to claim 1, wherein a lens unit of the zoom lens located closest to the reduction side includes one or more positive lenses having an aspheric surface,
   wherein the positive lens is made of a glass material, and
   wherein the focal length of the positive lens (fGasp) and the focal length of the zoom lens at the wide-angle end (fw) satisfy the following condition:

$5.2 < fGasp/fw < 9.0$.

5. A zoom lens according to claim 1, further comprising, in order from the enlargement side to the reduction side:
   a second lens unit having a positive optical power located closer to the reduction side than the first lens unit;

a third lens unit having a positive optical power;
a fourth lens unit having a negative optical power; and
a fifth lens unit having a positive optical power,
wherein the second lens unit, the third lens unit, and the fourth lens unit are moveable during zooming,
wherein the first lens unit and the fifth lens unit are stationary for zooming,
wherein the zoom lens consists of only the first lens unit, the second lens unit, the third lens unit, the fourth lens unit, and the fifth lens unit as constituent lens units, and
wherein the focal length of the second lens unit (f2a), the focal length of the third lens unit (f3a), and the focal length of the zoom lens at the wide-angle end (fw) satisfy the following conditions:

$6.0 < f2a/fw < 12$ $6.0 < f3a/fw < 15.$

6. A zoom lens according to claim 1, further comprising, in order from the enlargement side to the reduction side:
a second lens unit having a positive optical power located closer to the reduction side than the first lens unit;
a third lens unit having a positive optical power;
a fourth lens unit having a negative optical power;
a fifth lens unit having a positive optical power; and
a sixth lens unit having a positive optical power,
wherein the second lens unit, the third lens unit, the fourth lens unit, and the fifth lens unit are moveable during zooming,
wherein the first lens unit and the sixth lens unit are stationary for zooming,
wherein the zoom lens consists of only the first lens unit, the second lens unit, the third lens unit, the fourth lens unit, the fifth lens unit, and the sixth lens unit as constituent lens units, and
wherein the focal length of the second lens unit (f2b), the focal length of the third lens unit (f3b), and the focal length of the zoom lens at the wide-angle end (fw) satisfy the following conditions:

$6.5 < f2b/fw < 11$ $6.0 < f3b/fw < 13.$

7. An image projection apparatus comprising:
an image display element; and
a zoom lens according to claim 1, the zoom lens being configured to project image light from the image display element.

8. A zoom lens comprising a first lens unit having a negative optical power located closest to an enlargement side,
wherein the first lens unit includes one or more negative lenses having an aspheric surface, and
wherein an effective diameter of a first aspheric surface that is the largest of the effective diameters of the aspheric surfaces of the one or more negative lenses (φmax), the focal length of the first aspheric surface (f1asp), a distance in a direction of an optical axis between a position of the first aspheric surface on the optical axis and a position of the first aspheric surface through which an outermost off-axis ray passes (Rdepth), the focal length of the zoom lens at a wide-angle end (fw), and the focal length of the first lens unit (f1) satisfy the following conditions:

$-2.50 < f1/fw < -1.36$ $-9.0 < \phi max/f1 < -3.0$ $-10.0 < Rdepth/f1asp < -4.0.$ 9. A zoom lens including a first lens unit having a negative optical power located at a position closest to an enlargement side,
wherein the focal length of the zoom lens at the wide-angle end (fw) and the focal length of the first lens unit (f1) satisfy the following condition:

$-2.50 < f1/fw < -1.36,$ wherein the first lens unit includes one or more negative lenses having an aspheric surface, and
wherein a focal length of a first aspheric surface of the aspheric surfaces of the one or more negative lenses (f1asp) and a distance in a direction of an optical axis between a position of the first aspheric surface on the optical axis and a position of the first aspheric surface through which an outermost off-axis ray passes (Rdepth) satisfy the following condition:

$-10.0 < Rdepth/f1asp < -4.0.$

10. An image projection apparatus comprising:
an image display element; and
the zoom lens according to claim 9, the zoom lens being configured to project image light from the image display element.

11. A zoom lens including a first lens unit having a negative optical power located at a position closest to an enlargement side,
wherein the focal length of the zoom lens at the wide-angle end (fw) and the focal length of the first lens unit (f1) satisfy the following condition:

$-2.50 < f1/fw < -1.36,$ wherein the first lens unit includes one positive lens, and
wherein the positive lens satisfies the following conditions:

$1.63 < nd$ $vd < 35$ $0.008 < \theta gF - (0.644 - 0.00168 \cdot vd) < 0.040$ where $vd = (nd-1)/(nF-nC)$
$\theta gF = (ng-nF)/(nF-nC)$
where "nd", "ng", "nF", and "nC" denote refractive indices of the material of the positive lens with respect to d-line light, having a wavelength of 587.56 nm, g-line light, having a wavelength of 435.84 nm, F-line light, having a wavelength of 486.13 nm, and C-line light, having a wavelength of 656.28 nm, respectively.

12. A zoom lens including a first lens unit having a negative optical power located at a position closest to an enlargement side,
wherein the focal length of the zoom lens at the wide-angle end (fw) and the focal length of the first lens unit (f1) satisfy the following condition:

$-2.50 < f1/fw < -1.36,$ wherein a lens unit of the zoom lens located closest to the reduction side includes one or more positive lenses having an aspheric surface,
wherein the positive lens is made of a glass material, and wherein the focal length of the positive lens (fGasp) and the focal length of the zoom lens at the wide-angle end (fw) satisfy the following condition:

$$5.2 < fGasp/fw < 9.0.$$

13. A zoom lens including a first lens unit having a negative optical power located at a position closest to an enlargement side, wherein the focal length of the zoom lens at the wide-angle end (fw) and the focal length of the first lens unit (f1) satisfy the following condition:

$$-2.50 < f1/fw < -1.36,$$

the zoom lens further comprising, in order from the enlargement side to the reduction side:

a second lens unit having a positive optical power located closer to the reduction side than the first lens unit;

a third lens unit having a positive optical power;

a fourth lens unit having a negative optical power; and a fifth lens unit having a positive optical power, wherein the second lens unit, the third lens unit, and the fourth lens unit are moveable during zooming, wherein the first lens unit and the fifth lens unit are stationary for zooming, wherein the zoom lens consists of only the first lens unit, the second lens unit, the third lens unit, the fourth lens unit, and the fifth lens unit as constituent lens units, and wherein the focal length of the second lens unit (f2a), the focal length of the third lens unit (f3a), and the focal length of the zoom lens at the wide-angle end (fw) satisfy the following conditions:

$$6.0 < f2a/fw < 12$$

$$6.0 < f3a/fw < 15.$$

14. A zoom lens including a first lens unit having a negative optical power located at a position closest to an enlargement side, wherein the focal length of the zoom lens at the wide-angle end (fw) and the focal length of the first lens unit (f1) satisfy the following condition:

$$-2.50 < f1/fw < -1.36,$$

the zoom lens further comprising, in order from the enlargement side to the reduction side:

a second lens unit having a positive optical power located closer to the reduction side than the first lens unit;

a third lens unit having a positive optical power;

a fourth lens unit having a negative optical power;

a fifth lens unit having a positive optical power; and a sixth lens unit having a positive optical power, wherein the second lens unit, the third lens unit, the fourth lens unit, and the fifth lens unit are moveable during zooming, wherein the first lens unit and the sixth lens unit are stationary for zooming, wherein the zoom lens consists of only the first lens unit, the second lens unit, the third lens unit, the fourth lens unit, the fifth lens unit, and the sixth lens unit as constituent lens units, and wherein the focal length of the second lens unit (f2b), the focal length of the third lens unit (f3b), and the focal length of the zoom lens at the wide-angle end (fw) satisfy the following conditions:

$$6.5 < f2b/fw < 11$$

$$6.0 < f3b/fw < 13.$$

* * * * *